United States Patent [19]

Ogawa et al.

[11] Patent Number: 4,602,383
[45] Date of Patent: Jul. 22, 1986

[54] IMAGE DATA COMPRESSION SYSTEM

[75] Inventors: Katsuhiko Ogawa, Yokohama; Shinju Horiguchi, Yokosuka, both of Japan

[73] Assignee: Nippon Telegraph & Telephone Public Corporation, Tokyo, Japan

[21] Appl. No.: 606,074

[22] Filed: May 1, 1984

[30] Foreign Application Priority Data

May 7, 1983 [JP] Japan .................................. 58-79619
Jan. 28, 1984 [JP] Japan .................................. 59-14092

[51] Int. Cl.$^4$ .............................................. G06K 9/36
[52] U.S. Cl. ........................................ 382/56; 358/261
[58] Field of Search ................... 382/56; 358/260, 261, 358/263, 284, 135, 136

[56] References Cited

U.S. PATENT DOCUMENTS 4,135,214 1/1979 Weber ................................. 358/261
4,212,036 7/1980 Nakagome et al. ................. 358/261

Primary Examiner—Leo H. Boudreau
Assistant Examiner—Jacqueline Todd
Attorney, Agent, or Firm—Pollock, Vande Sande and Priddy

[57] ABSTRACT

In an image data compression system for encoding a binary or multilevel image signal into a compressed code, a line position is detected from the image signal and normalized, and its relative normalized line position is calculated from a line to be coded and an immediately preceding coded line, and then the relative normalized line position is encoded. Run positions (where pel values change) on the same line in the image signal are detected and normalized, and relative normalized run positions of adjacent one of the normalized run positions are calculated and encoded.

18 Claims, 32 Drawing Figures

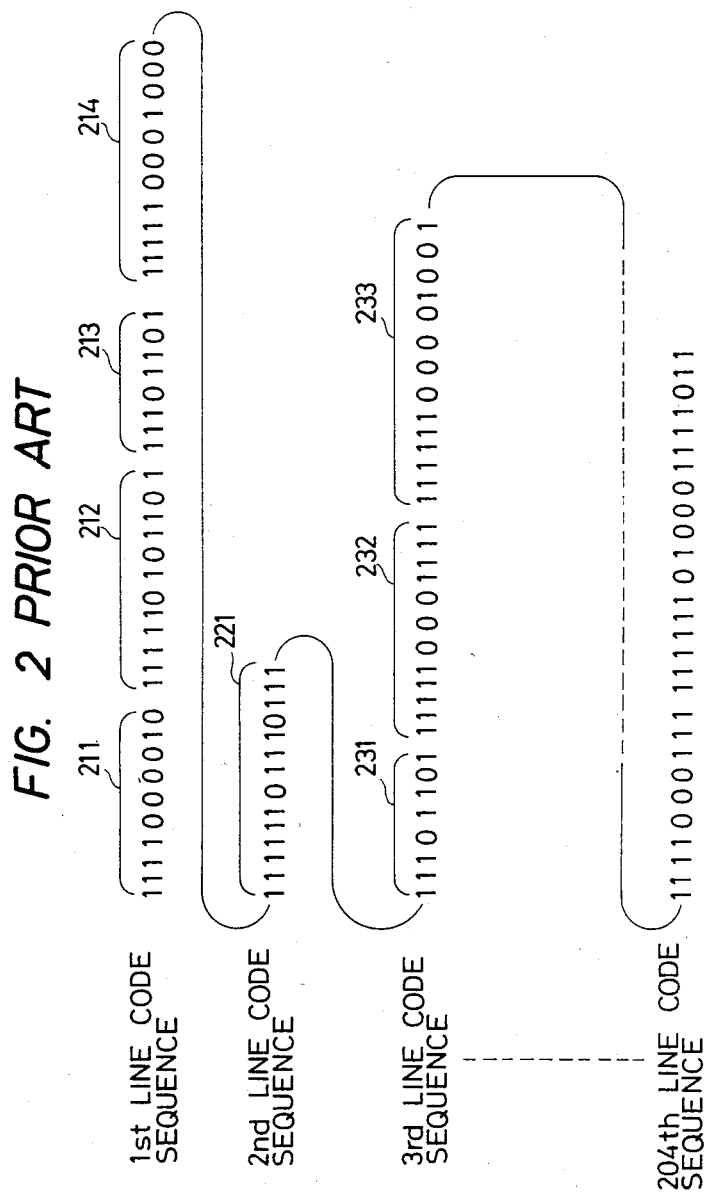

FIG. 3B
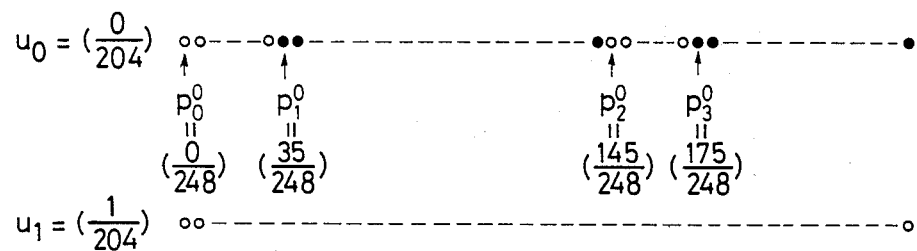
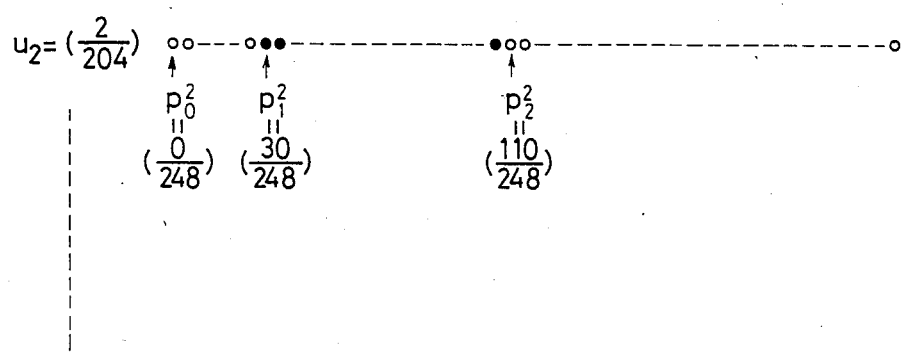
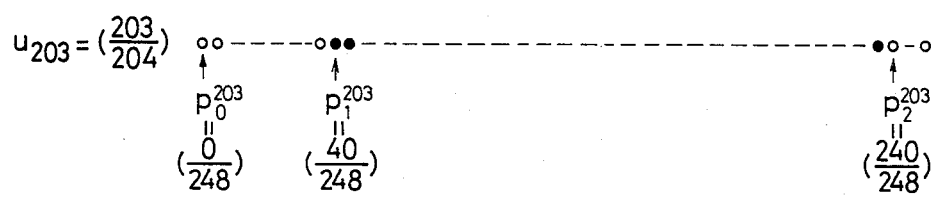

FIG. 4

| $D_j = 0.b_1 b_2 b_3 \cdots b_{g-1} b_g$ | CODE $\langle \bar{D}_j \rangle$ | CODE LENGTH |
|---|---|---|
| $b_s = 0,\ s \in \{1,\cdots g\}$ | 0 0 | 2 |
| $b_g = 1,\ b_s = 0,\ s \in \{1,\cdots g-1\}$ | 0 1 | 2 |
| $b_{g-1} = 1,\ b_s = 0,\ s \in \{1,\cdots g-2\}$ | 1 0 $b_g$ | 3 |
| $b_{g-2} = 1,\ b_s = 0,\ s \in \{1,\cdots g-3\}$ | 1 1 0 $b_{g-1}\ b_g$ | 5 |
| $b_{g-3} = 1,\ b_s = 0,\ s \in \{1,\cdots g-4\}$ | 1 1 1 0 $b_{g-2}\ b_{g-1}\ b_g$ | 7 |
| $b_{g-4} = 1,\ b_s = 0,\ s \in \{1,\cdots g-5\}$ | 1 1 1 1 0 $b_{g-3}\ b_{g-2}\ b_{g-1}\ b_g$ | 9 |
| --- | --- | --- |
| $b_2 = 1,\ b_1 = 0$ | 1 1 1 ----- 1 1 1 1 1 0 $b_3\ b_4\ \cdots\ b_{g-1}\ b_g$ | $2g-3$ |
| $b_1 = 1$ | 1 1 1 1 ----- 1 1 1 1 1 0 $b_2\ b_3\ b_4\ \cdots\ b_{g-1}\ b_g$ | $2g-1$ |

FIG. 5

| $B_i^j = 0.b_1 b_2 b_3 \cdots b_{f-1} b_f$ | CODE $\langle \bar{B}_i \rangle$ | CODE LENGTH |
|---|---|---|
| $b_s = 0, s \in \{1, \cdots f\}$ | 0 0 | 2 |
| $b_f = 1, b_s = 0, s \in \{1, \cdots f-1\}$ | 0 1 | 2 |
| $b_{f-1} = 1, b_s = 0, s \in \{1, \cdots f-2\}$ | 1 0 $b_f$ | 3 |
| $b_{f-2} = 1, b_s = 0, s \in \{1, \cdots f-3\}$ | 1 1 0 $b_{f-1} b_f$ | 5 |
| $b_{f-3} = 1, b_s = 0, s \in \{1, \cdots f-4\}$ | 1 1 1 0 $b_{f-2} b_{f-1} b_f$ | 7 |
| $b_{f-4} = 1, b_s = 0, s \in \{1, \cdots f-5\}$ | 1 1 1 1 0 $b_{f-3} b_{f-2} b_{f-1} b_f$ | 9 |
| --- | --- | --- |
| $b_2 = 1, b_1 = 0$ | 1 1 1 1 $\cdots$ 1 1 1 1 0 $b_3 b_4 \cdots b_{f-1} b_f$ | $2f - 3$ |
| $b_1 = 1$ | 1 1 1 1 $\cdots$ 1 1 1 1 0 $b_2 b_3 b_4 \cdots b_{f-1} b_f$ | $2f - 1$ |

$\langle H_0 \rangle \quad \langle \bar{D}_0 \rangle \quad \langle \bar{B}_1^0 \rangle \text{ --- } \langle \bar{B}_{a_1}^0 \rangle$ $\langle H_1 \rangle \quad \langle \bar{D}_1 \rangle \quad \langle \bar{B}_1^1 \rangle \text{ --- } \langle \bar{B}_{a_2}^1 \rangle$ $\langle H_b \rangle \quad \langle \bar{D}_b \rangle \quad \langle \bar{B}_b^b \rangle \text{ --- } \langle \bar{B}_{a_b}^b \rangle$

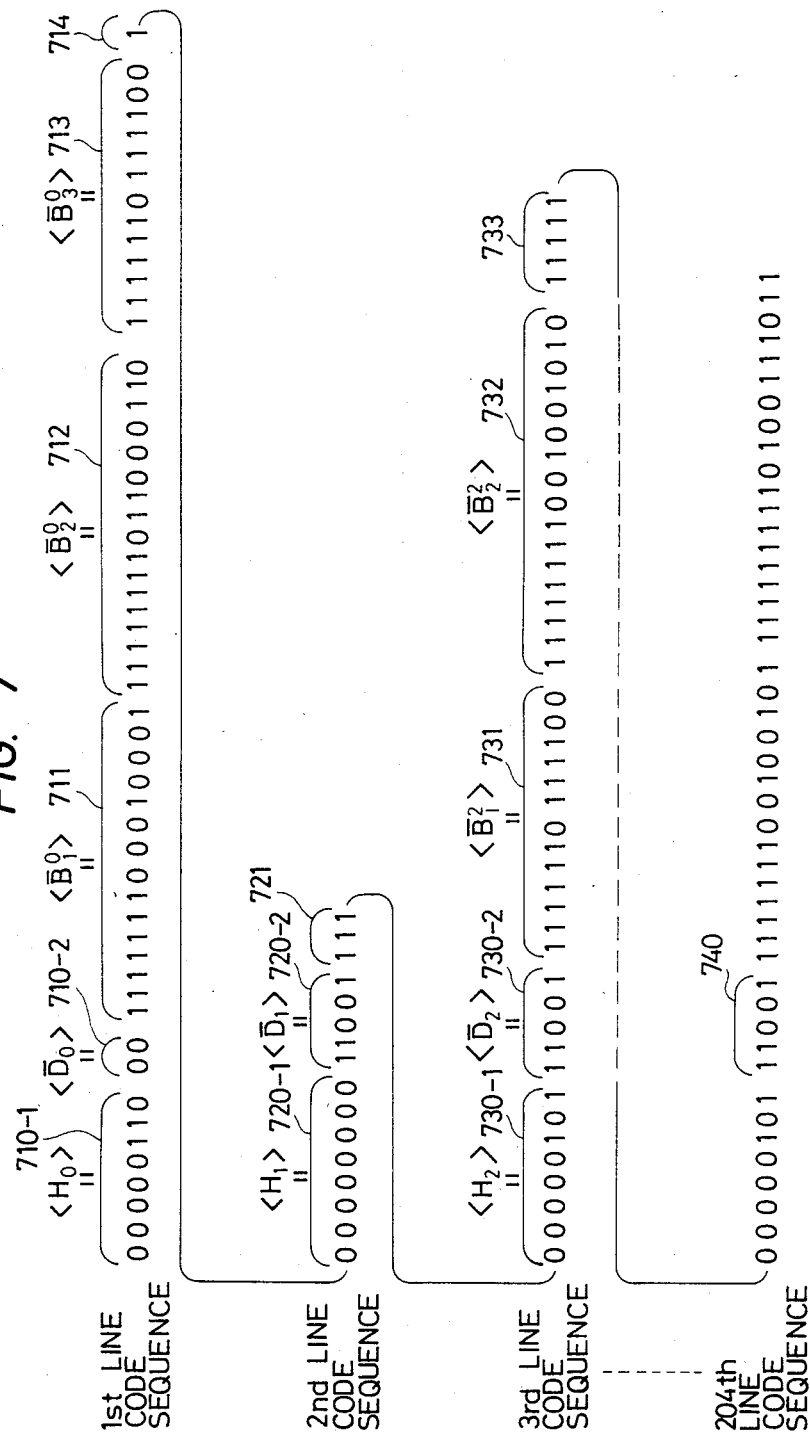

FIG. 16

| BINARY NUMBER $C_i^j$ | CODE $\langle \bar{C}_i^j \rangle$ | CODE LENGTH |
|---|---|---|
| 0. $b_1 b_2 \text{----} b_\ell$ | $b_1 b_2 \text{----} b_\ell$ | $\ell$ (FIXED) |

FIG. 17

$\langle H_0 \rangle \langle \bar{D}_0 \rangle \langle \bar{C}_0^0 \rangle \langle \bar{B}_1^0 \rangle \text{---} \langle \bar{C}_{a_1-1}^0 \rangle \langle \bar{B}_{a_1}^0 \rangle \langle \bar{C}_{a_1}^0 \rangle$ $\langle H_1 \rangle \langle \bar{D}_1 \rangle \langle \bar{C}_0^1 \rangle \langle \bar{B}_1^1 \rangle \text{---} \langle \bar{C}_{a_2-1}^1 \rangle \langle \bar{B}_{a_2}^1 \rangle \langle \bar{C}_{a_2}^1 \rangle$ $\langle H_b \rangle \langle \bar{D}_b \rangle \langle \bar{C}_0^b \rangle \langle \bar{B}_1^b \rangle \text{---} \langle \bar{C}_{a_b-1}^b \rangle \langle \bar{B}_{a_b}^b \rangle \langle \bar{C}_{a_b}^b \rangle$

FIG. 20

| COLOR PEL VALUES | | |
|---|---|---|
| VALUE $Sr_i$ OF R-COMPONENT | VALUE $Sg_i^j$ OF G-COMPONENT | VALUE $Sb_i^j$ OF B-COMPONENT |
| 0 (MIN) | 0 (MIN) | 0 (MIN) |
| 1 | 1 | 1 |
| ----- | ----- | ----- |
| $S_r - 2$ | $S_g - 2$ | $S_b - 2$ |
| $S_r - 1$ (MAX) | $S_g - 1$ (MAX) | $S_b - 1$ (MAX) |

FIG. 21

$\langle H_0 \rangle \ \langle \bar{D}_0 \rangle \ \langle \bar{C}_{r_0^0} \rangle \ \langle \bar{C}_{g_0^0} \rangle \ \langle \bar{C}_{b_0^0} \rangle \ \langle \bar{C}_{r_0^b} \rangle \ \langle \bar{C}_{g_0^b} \rangle \ \langle \bar{C}_{b_0^b} \rangle \ \langle \bar{B}_1^0 \rangle$ ---- $\langle \bar{C}_{r_{a_1-1}^0} \rangle \langle \bar{C}_{g_{a_1-1}^0} \rangle \langle \bar{C}_{b_{a_1-1}^0} \rangle \langle \bar{B}_{a_1}^0 \rangle \langle \bar{C}_{r_{a_1}^0} \rangle \langle \bar{C}_{g_{a_1}^0} \rangle \langle \bar{C}_{b_{a_1}^0} \rangle$ $\langle H_b \rangle \ \langle \bar{D}_b \rangle \ \langle \bar{C}_{r_0^b} \rangle \ \langle \bar{C}_{g_0^b} \rangle \ \langle \bar{C}_{b_0^b} \rangle \ \langle \bar{B}_1^b \rangle$ ---- $\langle \bar{C}_{r_{a_b-1}^b} \rangle \langle \bar{C}_{g_{a_b-1}^b} \rangle \langle \bar{C}_{b_{a_b-1}^b} \rangle \langle \bar{B}_{a_b}^b \rangle \langle \bar{C}_{r_{a_b}^b} \rangle \langle \bar{C}_{g_{a_b}^b} \rangle \langle \bar{C}_{b_{a_b}^b} \rangle$

FIG. 23

| VALUE OF ENTRY $E_i^j$ | PEL VALUE CODE OF R-COMPONENT | PEL VALUE CODE OF G-COMPONENT | PEL VALUE CODE OF B-COMPONENT |
|---|---|---|---|
| 1 | $\langle \bar{C}_{rE_1} \rangle$ | $\langle \bar{C}_{gE_1} \rangle$ | $\langle \bar{C}_{bE_1} \rangle$ |
| 2 | $\langle \bar{C}_{rE_2} \rangle$ | $\langle \bar{C}_{gE_2} \rangle$ | $\langle \bar{C}_{bE_2} \rangle$ |
| ⋮ | ⋮ | ⋮ | ⋮ |
| $\langle T \rangle$ | $\langle \bar{C}_{rE_T} \rangle$ | $\langle \bar{C}_{gE_T} \rangle$ | $\langle \bar{C}_{bE_T} \rangle$ |

FIG. 24

$\langle T \rangle \quad \langle \bar{C}_{rE_1} \rangle \langle \bar{C}_{gE_1} \rangle \langle \bar{C}_{bE_1} \rangle \text{---} \langle \bar{C}_{rE_T} \rangle \langle \bar{C}_{gE_T} \rangle \langle \bar{C}_{bE_T} \rangle$ $\langle H_0 \rangle \quad \langle \bar{D}_0 \rangle \quad \langle E_0^0 \rangle \quad \langle \bar{B}_1^0 \rangle \text{---} \langle E_{a_1-1}^0 \rangle \langle \bar{B}_{a_1}^0 \rangle \quad \langle E_{a_1}^0 \rangle$

⋮

$\langle H_b \rangle \quad \langle \bar{D}_b \rangle \quad \langle E_0^b \rangle \quad \langle \bar{B}_1^b \rangle \text{----} \langle E_{a_b-1}^b \rangle \langle \bar{B}_{a_b}^b \rangle \quad \langle E_{a_b}^b \rangle$

FIG. 26

$\underbrace{01}_{\langle \bar{D}_j \rangle} \underbrace{111111010011}_{\langle \bar{B}_1^j \rangle} \underbrace{1110111}_{\langle \bar{B}_2^j \rangle} \underbrace{1111111}_{\langle T \rangle}$

FIG. 28

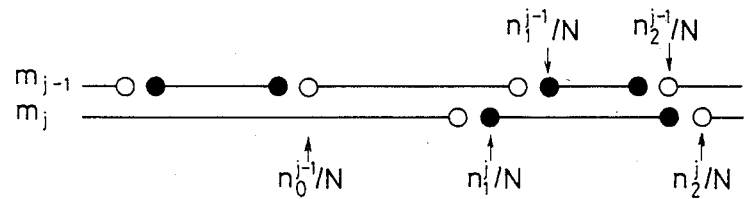

FIG. 29

| MODE | ELEMENTS TO BE CODED | CODE WORD |
|---|---|---|
| PASS | $n_i^{j-1}/N$, $n_{i+1}^{j-1}/N$ | 0001 |
| HORIZONTAL | $\frac{n_i^j}{N} - \frac{n_{i-1}^j}{N}$, $\frac{n_{i+1}^j}{N} - \frac{n_i^j}{N}$ | $001 + \langle \bar{B}_i^j \rangle + \langle \bar{B}_{i+1}^j \rangle$ |
| VERTICAL | $\frac{n_i^j}{N} - \frac{n_i^{j-1}}{N} = 0.0\text{---}00\overset{f_{th}\text{ bit}}{0}$ | 1 |
| | $\frac{n_i^j}{N} - \frac{n_i^{j-1}}{N} = 0.0\text{---}001$ | 011 |
| | $\frac{n_i^j}{N} - \frac{n_i^{j-1}}{N} = 0.0\text{---}010$ | 000011 |
| | $\frac{n_i^j}{N} - \frac{n_i^{j-1}}{N} = 0.0\text{---}011$ | 0000011 |
| | $\frac{n_i^j}{N} - \frac{n_i^{j-1}}{N} = 0.0\text{---}001$ | 010 |
| | $\frac{n_i^j}{N} - \frac{n_i^{j-1}}{N} = 0.0\text{---}010$ | 000010 |
| | $\frac{n_i^j}{N} - \frac{n_i^{j-1}}{N} = 0.0\text{---}011$ | 0000010 |

IMAGE DATA COMPRESSION SYSTEM

BACKGROUND OF THE INVENTION

The present invention relates to an image data compression system for use in facsimile or the like which encodes into a compressed code a binary or multilevel (gray scale) image signal obtained by main and sub-scanning of an image.

Heretofore there have been employed for the transmission and storage of a binary image signal one-dimensional runlength coding methods (e.g. Modified Huffman method and Wyle method) which use, as an information source, the number of successive pels (picture elements) of the same level in the main scanning of the binary image signal, i.e. what is called a runlength, an edge difference coding method (Modified Read method) which uses, as an information source, the difference between run changing points on a coding line (a main scanning line) and an immediately preceding line, and a predictive coding method. With these coding methods, the runlength in the one-dimensional runlength coding method, the difference between the run changing points in the edge difference coding method and the position of a reference pel in the predictive coding method are all dependent on the physical property, for example, the scanning density of the device used. However, some of binary image input/output device, such as facsimile apparatus and raster scan type CRT display, differ in the number of pels in the main scanning direction and the line density in the sub-scanning direction. If the same binary image encoded by the conventional coding method is provided to such devices of different line densities, then images displayed by them differ in size in horizontal and vertical directions, or partly drop out.

As a solution to this problem there has been proposed a system for matching, enlarging or reducing the size of the binary image through the use of a line density conversion system (for example, R. A. Ulichney et al., "Scaling Binary Images with the Telescoping Template", IEEE Trans. Patterns Analysis and Machine Intelligence, Vol. PAM1-4, No. 3, May 1982, p. 331-335). For the mutual conversion of binary image signals between devices of certain line densities, however, it is necessary to preknow their line densities. Accordingly, for the mutual conversion of binary image signals for transmission and reception by various types of input/output device, it is necessary to exchange information between the devices concerned on their line densities in advance and to prepare a plurality of conversion algorithms.

Also there has been proposed a method in which the number of the total pels in a picture is always set to a standardized value and encoded, as in facsimile, but this method is defective in that the matching property with geometric graphical forms and the extensibility for new functions are poor. Furthermore, according to the conventional methods, a program for inputting and outputting a binary patterns is implemented as a program dependent on the physical properties of the input/output devices, so that the portability of the program cannot be achieved.

Conventional coding methods for a half tone facsimile signal and a color image signal also have drawbacks similar to those referred to above in connection with the binary image signal.

SUMMARY OF THE INVENTION

It is therefore an object of the present invention to provide an image data compression system which permits encoding of a binary or gray scale image signal into a coded output independent of the physical properties of input/output devices.

Another object of the present invention is to provide an image data compression system which permits easy enlargement of reduction of a binary or gray scale image at the time of its decoding.

Another object of the present invention is to provide an image data compression system for binary or gray scale image signals which permits standardization of geometric graphic forms.

Yet another object of the present invention is to provide an image data compression system which improves the portability of a program for inputting and outputting a binary or gray scale image signal.

According to the present invention, a main-scanned line position is detected by line position detecting means from an image signal, and the detected line position is normalized by line normalizing means. A relative normalized line position of each line to be coded is calculated by relative normalized line position calculating means with respect to the immediately preceding coded line, and the relative normalized line position is encoded by relative normalized line position encoding means. Further, run position on one line of the image signal, where pel values change, are detected by run detecting means, and the detected run positions are normalized by run normalizing means. Relative normalized run positions are calculated by relative run position calculating means with respect to the adjacent normalized run positions in the image signal, and the relative normalized run positions are encoded by relative run position encoding means. The relative normalized run position codes and the relative normalized line position codes are synthesized and output by synthesizing means for each line.

In the case where the image signal is of gray scale, the pel values are normalized by pel normalizing means for each pel, and the normalized pel values are encoded into pel value codes, which are synthesized by the synthesizing means with the relative normalized line position codes and the relative normalized run position codes line by line.

A same-pel line consisting of the same-pel value is detected, and a succession of such same-pel lines is detected by same-pel line detecting means. For the detected successive same-pel lines, the line normalization, the relative normalized line position calculation, the relative line position encoding, the run normalization, the relative normalized run position calculation and the relative run position encoding are omitted by skipping means. In the synthesization of the codes for each line, a header indicating the code length of the composite line is added by the synthesizing means, or a terminate code is added to the end of the composite line.

BRIEF DESCRIPTION OF THE DRAWINGS

FIG. 2 is a diagram showing an example of the binary image coding of FIG. 1 by the Wyle coding method;

FIG. 3B is a diagram showing, by way of example, normalization of the run positions and line positions depicted in FIG. 3(A);

FIG. 4 is a diagram showing an example of a code table for encoding normalized line positions;

FIG. 5 is a diagram showing an example of a code table for encoding normalized run positions;

FIG. 7 is a diagram, by way of example, code trains of the binary image of FIG. 1 arranged by the code train scheme depicted in FIG. 6;

FIG. 16 is a diagram showing an example of a code table of normalized pel values;

FIG. 17 is a diagram showing an example of the code train scheme of a gray scale image signal;

FIG. 20 is a diagram showing by way of example, pel values of color picture elements;

FIG. 21 is a diagram illustrating an example of the code train scheme of a color image signal;

FIG. 23 is a diagram showing an example of a lookup table of color pel value codes;

FIG. 24 is a diagram showing an example of the code scheme using the lookup table depicted in FIG. 23;

FIG. 26 is a diagram showing an example of a code train using a terminate code;

FIG. 28 is a diagram showing, by way of example, the relation between a reference line and a coding line in the two-dimensional coding;

FIG. 29 is a diagram showing an example of a code table for the coding in FIG. 27.

DESCRIPTION OF THE PREFERRED EMBODIMENT

Figure 1:
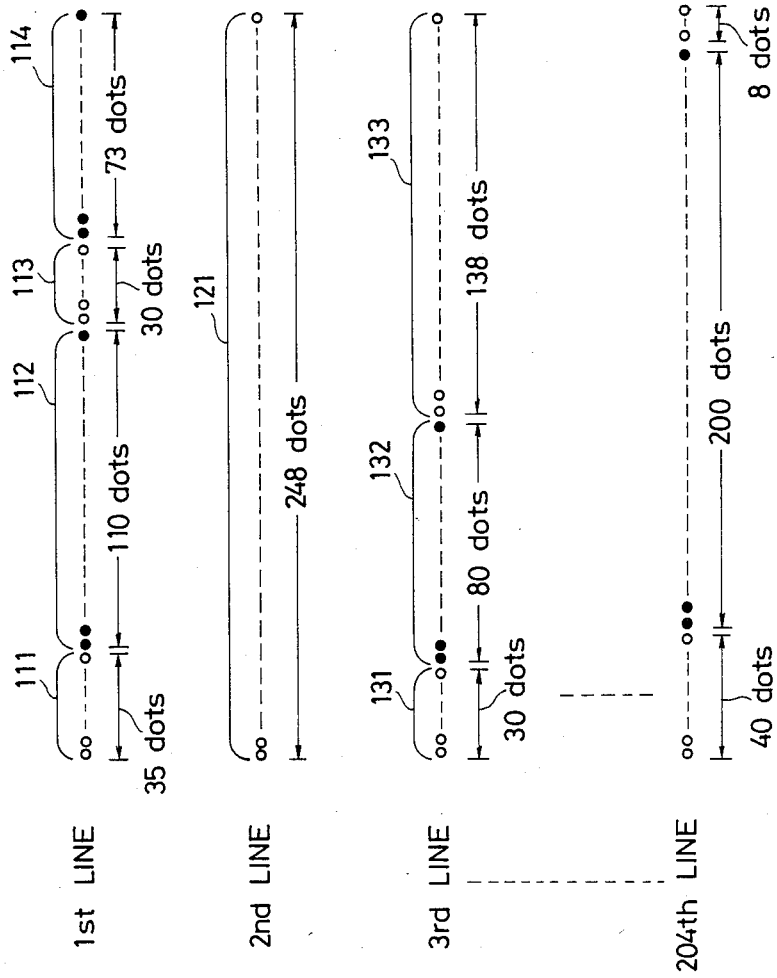
FIG. 1 is a diagram showing an example of a two-dimensional binary image.

To facilitate a better understanding of the present invention, a brief description will be given first of a conventional coding system. FIG. 1 shows an example in which each picture element (a pel) of a two-dimensional image is encoded into binary codes. A run is the section in which pels of the same kind occur in succession. Let it be assumed here that a first run of a binary image in a horizontal direction (in a main scanning direction) starts with the white run. A first line in a vertical direction (in a sub-scanning direction) consists of a first (white) run 111, the next (black) run 112 and, further, runs 113 and 114. A second line consists of the run 121 alone, i. e. white pels (white dots), and this line is referred to as a white line. A third line consists of runs 131 to 133. A last line is 204th.

FIG. 2 shows code trains into which the two-dimensional binary image in FIG. 1 is encoded by the conventional Wyle coding method (For the code table used, see H. Wyle et al., Reduced-Time Facsimile Transmission by Digital Coding, IRE Trans., Vol. CS-9, No. 3, 1961). The runs 111 to 114 are rendered into codes 211 to 214, the run 121 a code 221 and the runs 131 to 133 codes 231 to 233. As shown in FIG. 2, each run length is represented by the number of white or black pels occurring in succession, and a code table is prepared using the run lengths represented by this pel train. In the prior art the binary image is stored or transmitted by coding and decoding processes through using the code table.

However, some of input-output devices for binary images (e.g. facsimile apparatus, a raster scanning type CRT display, etc.) adopt different numbers of pels or scanning densities in the main scanning and sub-scanning directions (or horizontal and vertical directions), so that if a binary image encoded by the aforesaid coding method is transmitted and received between such apparatuses of different line densities, dimensions of the reproduced image in the horizontal and vertical directions will differ from the dimensions of the original binary image. To avoid this, there has been proposed a system of matching, enlarging or reducing the size of the binary image through utilization of a line density conversion technique. Since the conversion takes place between apparatuses of different scanning densities, however, it is necessary to preknow their individual scanning densities; namely, for mutual conversion of a binary image which is transmitted and received between various types of input-output devices, it is necessary for the concerned devices to exchange information on their line densities in advance, and a plurality of algorithms for conversion must be prepared.

<Principles of the Invention>

Figure 3A:
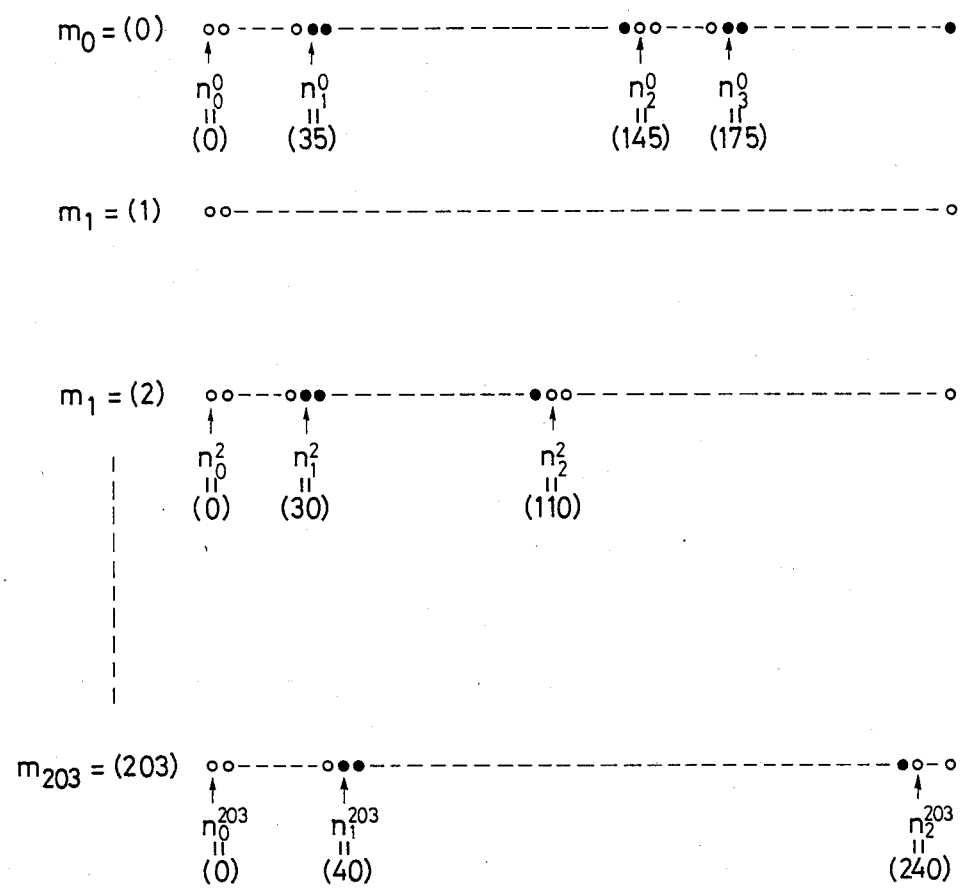
FIG. 3A is a diagram showing, by way of example, run positions and line positions in the binary image shown in FIG. 1.

FIG. 3A shows the vertical (the sub-scanning direction) positions (hereinafter referred to as line positions) of the horizontal (the main scanning direction) scan lines of the two-dimensional binary image depicted in FIG. 1 and the positions of runs in each horizontal scan line, that is, the positions where pel values vary (hereinafter referred to as run positions). The line positions of the first, second, third and 204 scan lines in FIG. 1 are denoted by $m_0$, $m_1$, $m_2$ and $m_{203}$, respectively. The run positions of the runs 111, 112, 113 and 114 in the first line are $n_0{}^0$, $N_1{}^0$, $n_2{}^0$ and $n_3{}^0$, respectively, and the run positions of the runs 131, 132 and 133 in the third line are $n_0{}^2$, $n_1{}^2$ and $n_2{}^2$, respectively.

FIG. 3B shows normalized representations of the line position $m_j$ and the run position $n_i{}^j$ depicted in FIG. 3A. The operation for normalization is generally expressed by $u_j = m_j/M$ and $p_i{}^j = n_i{}^j/N$. Here, M and N are the numbers of pels in the vertical and the horizontal direction, respectively, and in the example of FIG. 1, $M = 204$ and $N = 248$. Further, $u_j$ (hereinafter referred to as a normalized line position) and $p_i{}^j$ (hereinafter referred to as a normalized run position) are represented by binary numbers which satisfy $0 \leq u_j < 1$ and $0 \leq p_i{}^j < 1$, respectively, and in general, $u_j$ and $p_i{}^j$ are infinite decimals. Then, $u_j$ and $p_i{}^j$ are each represented by a binary number of significant k digits below the decimal point, counting fractions of 1 as a unit and disregarding 0 at the (k+1)th decimal place. In this case, k is selected larger than $[\log_2 N]$ (where [x] means a number obtained by counting fractions below the decimal point of x as one). Thus an accurate reconstruction of the run position can be achieved, and the same is true of the line position. For example, the normalized line position of the line position $m_2$ is represented by a binary decimal of 10 digits, 0.0000001010, counting fractions of 1 as a unit and disregarding 0 at the 11th decimal place since $u_2$ is $2/204$. The normalized run position $n_1{}^2$, where $p_1{}^2 = 30/248$, is represented by a binary decimal of 10 digits, 0.0001111100, counting fractions of 1 as a unit and disregarding 0 at the 11th decimal place. A difference $D_j$ between the normalized line position of a line to be coded and that of a coded line immediately preceding the line to be coded (the difference $D_j$ will hereinafter be referred to as a relative normalized line position) is defined in a binary representation with 10 digits below the decimal point as follows $D_0 = u_0 - 0 = 0.0000000000$ (Only a first normalized line position is calculated with $u_0$- 0).

$D_1 = u_1 - u_0 = 0.0000000101$ $D_2 = u_2 - u_1 = 0.0000000101$

A difference $B_i{}^j$ between the normalized run position of a run to be coded and that of a coded run immediately preceding the run to be coded, that is, the difference between adjacent normalized run positions (hereinafter referred to as a relative normalized run position) is defined in a binary representation with 10 digits below the decimal point as follows:

$B_1{}^0 = p_1{}^0 - p_0{}^0 = 0.0010010001$ $B_2{}^0 = p_2{}^0 - p_1{}^0 = 0.0111000110$ $B_3{}^0 = p_3{}^0 - p_2{}^0 = 0.0001111100$ $B_1{}^2 = p_1{}^2 - p_0{}^2 = 0.0001111100$ $B_2{}^2 = p_2{}^2 - p_1{}^2 = 0.0101001010$

FIG. 4 is an example of a code table showing the correspondence between the binary number $D_j$ and a code $<\overline{D}_j>$ of the relative normalized line position. In FIG. 4, the binary number $D_j$ is represented by $0.b_1 b_2 b_3 b_4 \ldots b_{g-1} b_g$. For instance, in the case of the aforesaid $D_1 = 0.0000000101$, assuming that $g = 10$ (where g indicates the number of digits of the binary number $D_j$ below the decimal point, and it will hereinafter be referred to as a significant digit number g), then $b_1, b_2, \ldots b_7$ are each zero, $b_{g-2} = b_8 = 1$, $b_{g-1} = b_9 = 0$ and $b_g = b_{10} = 1$, so that the code $<\overline{D}_1>$ is 11001.

FIG. 5 is an example of a code table showing the correspondence between the binary number $B_i{}^j$ and a code $<\overline{B}_i{}^j>$ of the relative normalized run position. The binary number $B_i{}^j$ is represented by $0.b_1 b_2 b_3 b_4 \ldots b_{f-2} b_{f-1} b_f$. For example, for the aforesaid $B_1{}^2 = 0.0001111100$, assuming that $f = 10$ (where f indicates the number of digits of the binary number $B_i{}^j$ below the decimal point, and it will hereinafter be referred to as a significant digit number f) in FIG. 5, then $b_1 = 0$, $b_2 = 0$, $b_3 = 0$, $b_4 = b_{f-6} = 1$ and $b_{f-5}$, $b_{f-4}$, $b_{f-3}$, $b_{f-2}$, $b_{f-1}$ and $b_f$ and 1, 1, 1, 1, 0 and 0, respectively, so that the code $<\overline{B}_1{}^2>$ becomes 1111110111100.

Figures 6, 13:
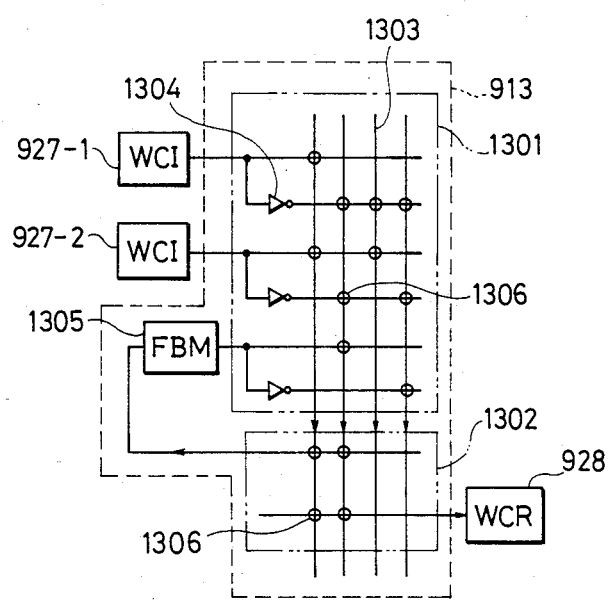
FIG. 6 is a diagram showing an example of a code train scheme.
FIG. 13 is a block diagram illustrating an example of the arrangement of a white line continuing state circuit (WCS) 913 in FIG. 9.

FIG. 6 shows an example of a coding scheme for encoding a binary image signal into a compressed code. In FIG. 6 $<H_j>$ (where $j = 0, 1, \ldots b$) is a header of one line; for an all-white line, $H_j = (00)$ in hexadecimal notation i.e., $(00)_{16}$ and, for other lines, it indicates the number of bytes of $<\overline{D}_j><\overline{B}_i{}^j>\ldots <\overline{BHD} i^j>\ldots <\overline{B}_a{}^j>$, that is, number of bytes of the coded line. $<\overline{D}_j>$ represents a code of the relative normalized line position $D_j$, and this code is shown in FIG. 4. $<\overline{B}_i{}^j>$ represents a code of the relative normalized run position $B_i{}^j$, and it is shown in FIG. 5. That is, the codes $<\overline{D}_j>$ and $<\overline{B}_i{}^j>$ are combined for each line, and a header $<H_j>$ representing the combined code length is added to the forefront of the combined codes. In the case where one line consists of white pels alone (a white line), $<\overline{D}_j>$ is added to the header $<H_j> = <(00)_{16}>$ of the line. When there are two or more successive white lines, the image signal of the second white line to the last white line immediately before a line containing black pels is not subjected to coding. The overall length of a code train forming one line is an integral multiple of a byte, and when the least significant bit of the last code $<\overline{B}_a{}^j>$ of a line does not become a byte boundary, 1s are padded until the least significant bit becomes the byte boundary. It is assumed that one line starts with a white pel, and when it starts with a black pel, the code $<\overline{B}_i{}^j>$ of the relative normalized run position $B_i{}^j = 0$ is specifically inserted.

Coding the binary image of FIG. 1 according to the coding scheme exemplified in FIG. 6, it becomes as shown in FIG. 7. The code $<\overline{D}_0>$ of the relative normalized line position $D_0$ of the first line is indicated by a reference number 710-2. Further, the codes $<\overline{B}_1{}^0>$, $<\overline{B}_2{}^0>$ and $<\overline{B}_3{}^0>$ of the relative normalized run positions obtained from the normalized run positions of the first line are indicated by reference numbers 711, 712 and 713, respectively. The number of bits of the codes $<\overline{D}_0>$, $<\overline{B}_1{}^0>$, $<\overline{B}_2{}^0>$ and $<\overline{B}_3{}^0>$ is a total of 47, and since it is one bit short of six bytes, a padding bit "1" for the byte boundary is provided, as indicated by a reference number 714, and the header $<H_0> = 00000110$, which is $(06)_{16}$, is added as indicated by a reference number 710-1. A header $<H_1>$ of the second line is indicated by a reference number 720-1, and since the second line is a white line consisting of white pels alone, the header value is $(00)_{16}$. The code $<\overline{D}_1>$ of the relative normalized line position $D_1$ of the second line is the same as the aforementioned example $D_1$ with respect to FIG. 4, as indicated by a reference number 720-2. Since this code $<\overline{D}_1>$ is of five-bit length, 1s of three bits are added to obtain the byte boundary. That is, a reference number 721 indicates these padding bits. A header $<H_2>$ and the relative normalized line position code $<\overline{D}_2>$ of the third line are indicated by reference numbers 730-1 and 730-2, respectively, and the relative normalized run position codes $<\overline{B}_1{}^2>$ and $<\overline{B}_2{}^2>$ of the third line are indicated by 731 and 732, respectively. Padding bits for the byte boundary are added, as indicated by a reference number 733.

The code of the relative normalized line position of the 204th line is indicated by a reference number 740. Since it is assumed that a 203rd or 202nd line contains black pels, the code $<\overline{D}_1>$ is 11001. For example, when a 201st lines contains black pels and the 202nd and 203rd lines are white lines, the code of the relative normalized line position $D_j$ of the 204th line becomes 1110010.

Figure 8:
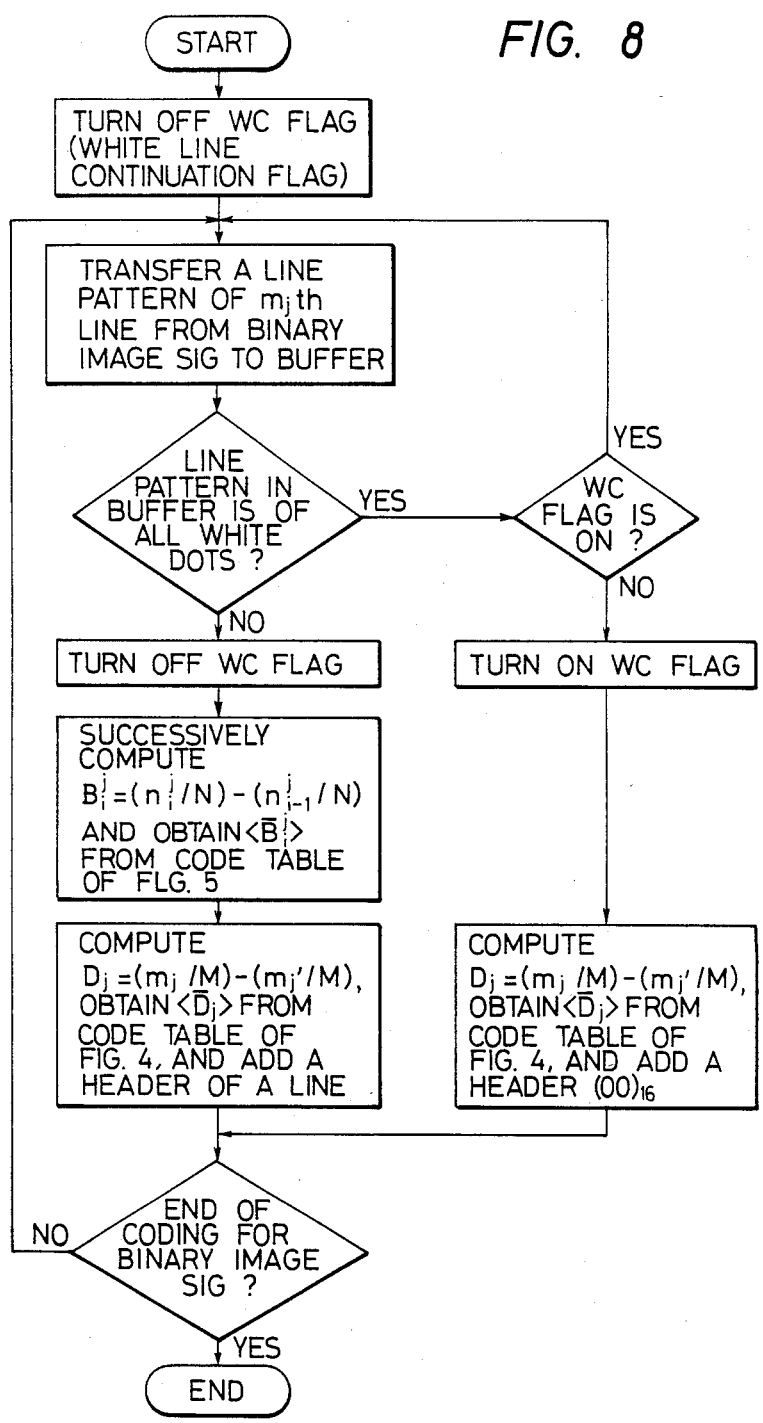
FIG. 8 is a flowchart illustrating an example of operation for encoding a binary image signal.

FIG. 8 illustrates an example of a binary image coding process.

<First Embodiment>

Overall Structure

Figure 9:
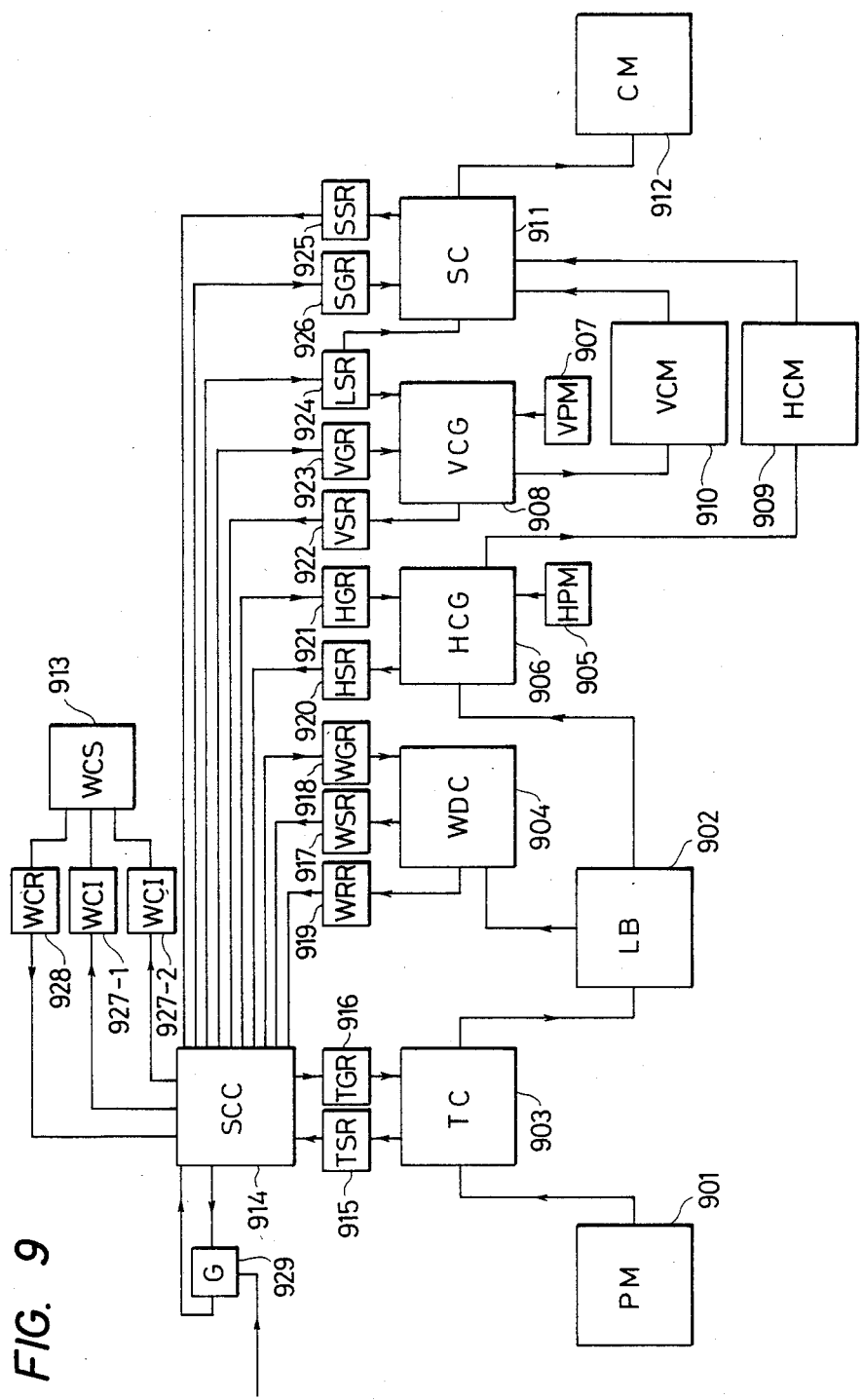
FIG. 9 is a block diagram illustrating an example of the arrangement of the present invention as being applied to the encoding of a binary image signal.

FIG. 9 illustrates an example of the arrangement of the present invention as being applied to the encoding of a binary image into a compressed code train. A pattern memory (PM) 901 is provided for storing binary image signal obtained by the main scanning and the sub-scanning of an image. A line buffer (LB) 902 is a buffer for storing the binary image signal pattern of one line, i.e. line pattern signal of one main scanning line. The binary image signal of one line in the pattern memory 901 is transferred via a transfer circuit (TC) 903 to the line buffer 902. It is detected by a white line detecting circuit (WDC) 904 whether the line pattern signal stored in the line buffer 902 is a white line or not. The number of pels, N, (where N is an integer larger than 0) of a two-dimensional image in the horizontal direction (the main scanning direction) is stored in a horizontal pel-number memory (HPM) 905. A horizontal code generator (HCG) 906 detects the run position $n_i{}^j$ in the line pattern signal stored in the line buffer 902 and generates the normalized run position $p_i{}^j$, the relative normalized run position $B_i{}^j$ and the code $<\overline{B}_i{}^j>$. The number of pels, M, (where M is an integer larger than 0) of the image in the vertical direction (the sub-scanning direction) is stored in a vertical pel-number memory (VPM) 907. A vertical code generator (VCG) 908 detects the line position $m_j$ of the line pattern signal in the line buffer 902 and generates the normalized line position $u_j$, the relative normalized line position $D_j$ and the code $<\overline{D}_j>$. A train of the codes $<\overline{B}_i{}^j>$ generated for one line by the horizontal code generator 906 is stored in a horizontal code memory (HCM) 909, and the code $<\overline{D}_j>$ generated by the vertical code generator 908 is stored in a vertical code memory (VCM) 910. The codes stored in the code memories 909 and 910 are combined by a synthesizing circuit (SC) 911 and is added with a header to produce a code train of one line signal. The code train, which is the output of the synthesizing circuit 911, is stored in a code memory (CM) 912 for each line. It is controlled by a white line continuing state circuit (WCS) 913 whether two or more white lines occur in succession. A sequence control circuit (SCC) 914 performs sequence control of the transfer circuit 903, the white line detecting circuit 904, the horizontal code generator 906, the vertical code generator 908, the synthesizing circuit 911 and the white line continuing state circuit 913. A flag indicating an operation end state of the transfer circuit 903 is stored in a transfer circuit state register (TSR) 915, and a flag for instructing the transfer circuit 903 to start its operation is stored in a transfer circuit trigger flag register (TGR) 916. A flag indicating an operation end state of the white line detector 904 is stored in a white line detector state register (WSR) 917, and a flag for instructing the start of the operation of the white line detector 904 is stored in a white line detector trigger flag register (WGR) 918. A flag at the time of the line pattern signal in the line buffer 902 being a white line is stored in a white line detection result register (WRR) 919. A flag indicating an operation end state of the horizontal code generator 906 is stored in a horizontal circuit state register (HSR) 920, and a flag for instructing the start of the operation of the horizontal code generator 906 is stored in a horizontal circuit trigger flag register (HGR) 921. A flag indicating an operation end state of the vertical code generator 908 is stored in a vertical circuit state register (VSP) 922, and a flag for instructing the start of the operation of the vertical code generator 908 is stored in a vertical circuit trigger flag register (VGR) 923. A flag for instructing the vertical code generator 908 and the synthesizing circuit 911 to perform processing for a white line is stored in a line state register (LSR) 924. A flag indicating an operation end state of the synthesizing circuit 911 is stored in a synthesizing circuit state register (SSR) 925, and a flag for instructing the start of the operation of the synthesizing circuit 911 is stored in a synthesizing circuit trigger flag register (SGR) 926. Input information to the white line continuing state circuit 913 for controlling a white line continuing flag is stored in a white line continuing state registers (WCI) 927-1 and 927-2, and the white line continuing flag is stored in a white line continuing flag register (WCR) 928. A trigger pulse for resetting the circuits 903, 904, 906, 908, 911 and 914 to start the coding process of one line is generated by a trigger pulse generator (G) 929.

Horizontal Code Generator (HCG) 906

Figure 10:
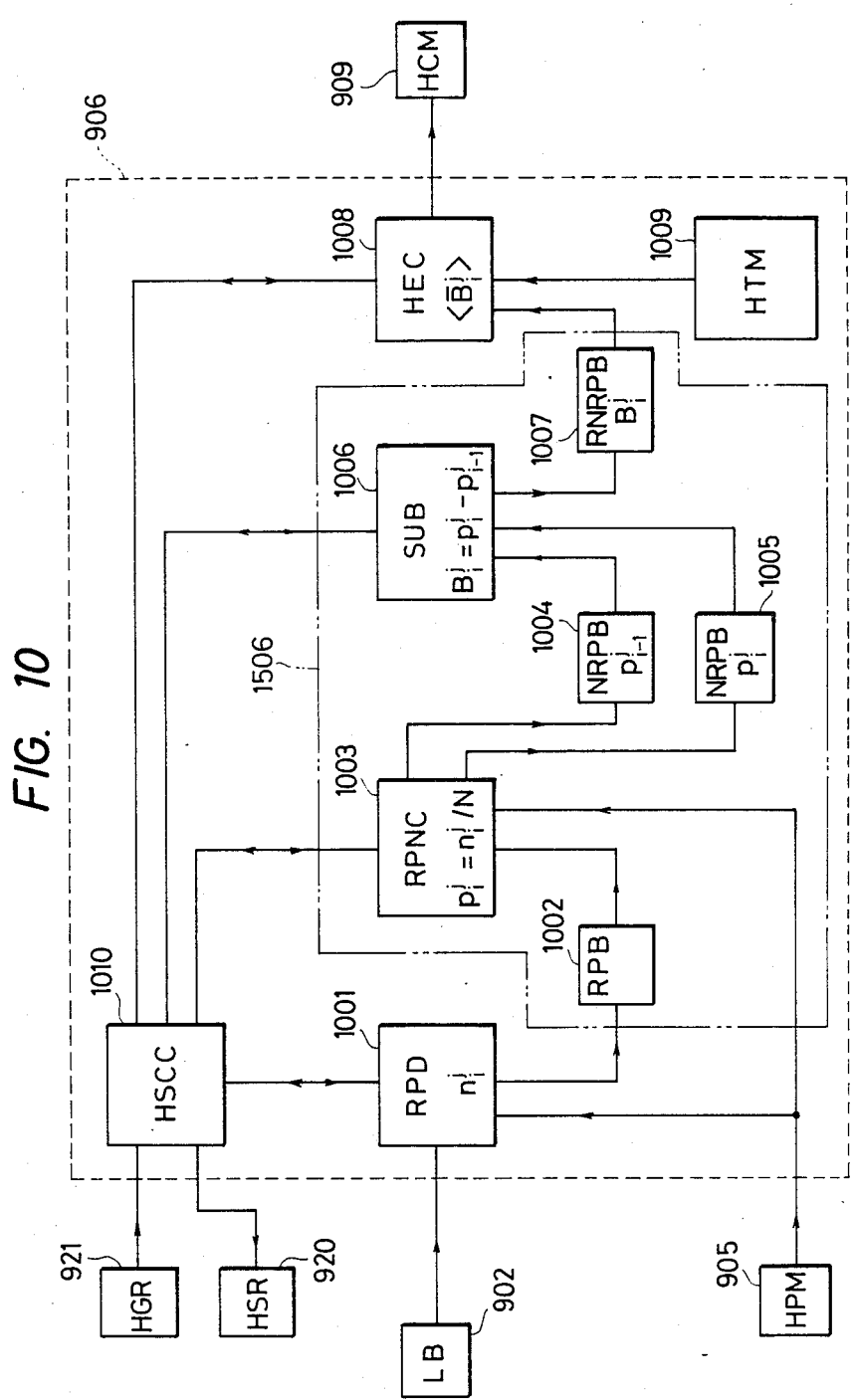
FIG. 10 is a block diagram illustrating an example of the arrangement of a horizontal code generator (HCG) 906 in FIG. 9.

FIG. 10 illustrates an example of the arrangement of the horizontal code generator 906. The run position $n_i{}^j$ of the binary image signal of one line, i.e. the line pattern signal in the line buffer 902 is detected by a run position detector (RPD) 1001, and the detected run position $n_i{}^j$ is stored in a run position buffer (RPB) 1002. A dividing operation $n_i{}^j/N$ is carried out in a run position normalizing circuit (RPNC) 1003 on the basis of the number of pels N in the main scanning direction, stored in the horizontal pel-number memory 905, and the run position $n_i{}^j$ stored in the run position detector 1001, thereby obtaining the normalized run position $p_i{}^j$. The normalized run position $p_i{}^j-1$ ($=n_{i-1}{}^j/N$) and $p_i{}^j/N$ ($=n_i{}^j/N$) are stored in a normalized run position buffer (NRPB) 1004 and a normalized run position buffer (NRPB) 1005, respectively. A difference, $B_i{}^j=p_i{}^j-p_{i-1}{}^j$, between the contents of the normalized run position buffers 1004 and 1005 is obtained with a subtractor (SUB) 1006, and its output $B_i{}^j$ is stored in a relative normalized run position buffer (RNRPB) 1007. The stored content $B_j'$ is encoded by an encoder (HEC) 1008 according to the code table shown in FIG. 5. The code table shown in FIG. 5 is prestored in a code table memory (HTM) 1009. The circuits 1001, 1003, 1006 and 1008 are sequence-controlled by an HCG sequence control circuit (HSCC) 1010.

Vertical Code Generator (VCG) 908

Figure 11:
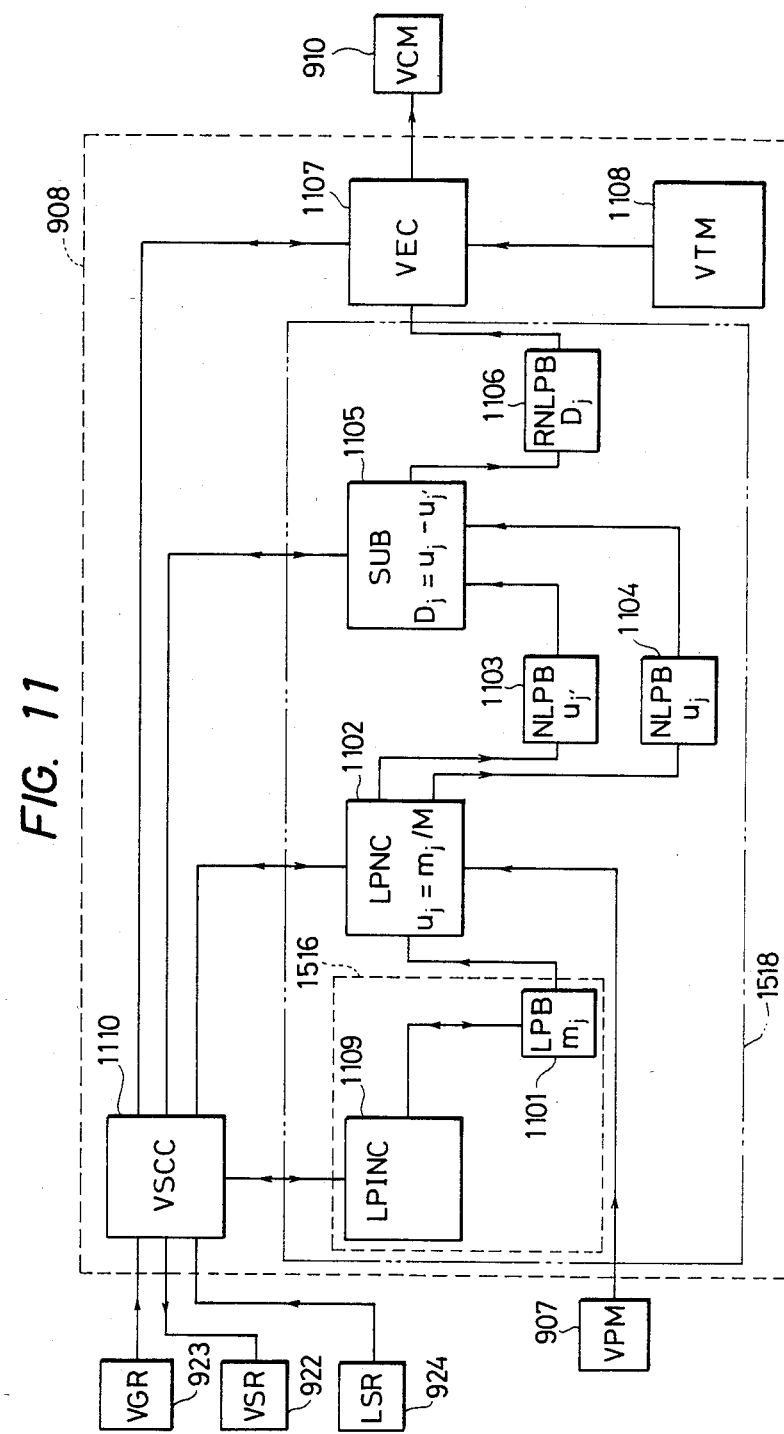
FIG. 11 is a block diagram illustrating an example of the arrangement of a vertical code generator (VCG) 908 in FIG. 9.

FIG. 11 illustrates an example of the arrangement of the vertical code generator 908. The line position $m_j$ of each line of the binary image signal is stored in a line position buffer (LPB) 1101, and a dividing operation $m_j/M$ is conducted by a line position normalizing circuit (LPNC) 1102 on the basis of the line position $m_j$ and the number of pels M in the sub-scanning direction, stored in the vertical pel-number memory 907, thereby obtaining the normalized line position $u_j$. The normalized line position $u_{j'}(=m_{j'}/M)$ is stored in a normalized line position buffer (NLPB) 1103 and the normalized line position $u_j(=m_j/M)$ is stored in a normalized line position buffers (NLPB) 1104. A difference, $D_j=u_j-u_{j'}$, between the normalized line positions stored in these normalized line position buffers 1103 and 1104 is obtained by a subtractor (SUB) 1105, the output $D_j$ or which is stored in a relative normalized line position buffer (RNLPB) 1106. The stored content $D_j$ is encoded by an encoder (VEC) 1107 according to the code table shown in FIG. 4. The code table depicted in FIG. 4 is stored in a code table memory (VTM) 1108. The line position stored in the line position buffer 1101 is incremented by a line position increment circuit (LPINC) 1109. The circuits 1102, 1105, 1107 and 1109 are sequence-controlled by a VCG sequence control circuit (VSCC) 1110.

Synthesizing Circuit (SC) 911

Figure 12:
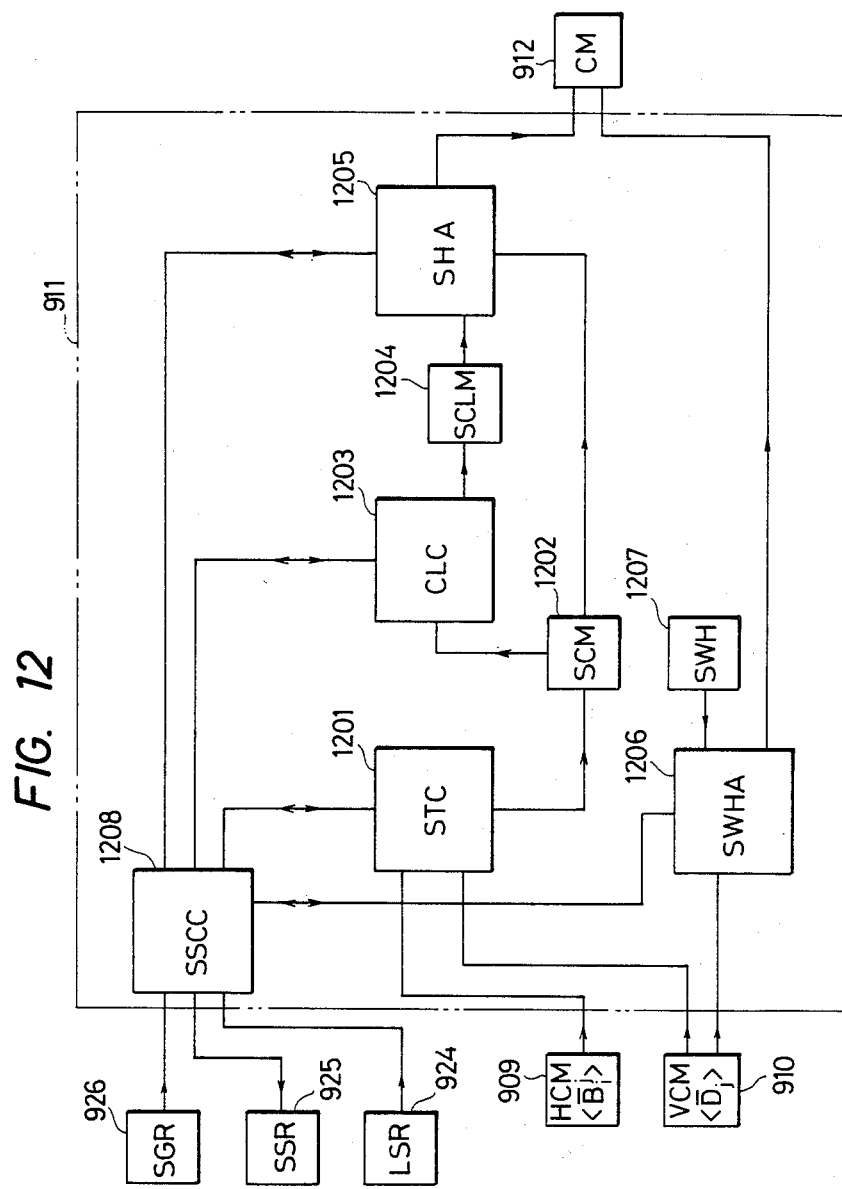
FIG. 12 is a block diagram illustrating an example of the arrangement of a synthesizing circuit (SC) 911 in FIG. 9.

FIG. 12 illustrates an example of the arrangement of the synthesizing circuit 911. The codes $<\overline{B_j'}>$ for one line in the horizontal code memory 909 and the code $<\overline{D_j}>$ in the vertical code memory 910 are combined by a transfer circuit (STC) 1201 into a code train $<\overline{D_j}><\overline{B_j'}>\ldots<\overline{B_{aj}}>$, and the code train of the line, which is the output of the transfer circuit 1201, is stored in a code memory (SCM) 1202. The code length (which is the length in bytes, and fractions, if any, are counted of the code train in the code memory 1202 is calculated by a code length calculator (CLC) 1203, and the calculated code length is stored in a code length memory (SCLM) 1204. The code length in the memory 1204, which is used as a header, and the code train in the code memory 1202 are combined by a header adder (SHA) 1205. In this case, the code train is padded with a required number of bits "1" to terminate with a byte boundary. In the case where the coding line of the binary image signal is a white line and it is the first one of two or more successive white lines, a white line header (which is $(00)_{16}$ in FIG. 6) is added, by a white line header adder (SWHA) 1206, to the code $<\overline{D_j}>$ in the vertical code memory 910 and, if necessary, the code is padded with a bit of bits "1" so that it ends with a byte boundary. The white line header is prestored in a white line header memory (SWH) 1207. The circuit 1201, 1203, 1205 and 1206 are subjected to sequence control by an SC sequence control circuit (SSCC) 1208.

White Run Continuing State Circuit (WCS) 913

FIG. 13 illustrates an example of the white run continuing state circuit 913 which is constituted by a PLA (Programmable Logic Array). The contents of the white run continuing state registers 927-1 and 927-2 are provided to an AND array 1301, the outputs of which are input via product term lines 1303 (vertical lines) into an OR array 1302. The lines 1303 are provided in common to the arrays 1301 and 1302. The inputs to the AND array 1301 are each applied thereto directly and also applied thereto via NOT circuits 1304. The internal state of the white run continuing state circuit 913 is stored in a feed-back memory 1305. Indicated by reference numeral 1306 are cross-points for producing logical products or sums in the PLA. That is, the AND array 1301 outputs on each vertical line 1303, the logical product of the inputs from all the crosspoints 1306 on the line, and the OR array 1302 provides on each horizontal line the logical sum of crosspoints 1306 on the horizontal line.

Sequence Control Circuit (SCC) 914

Figure 14:
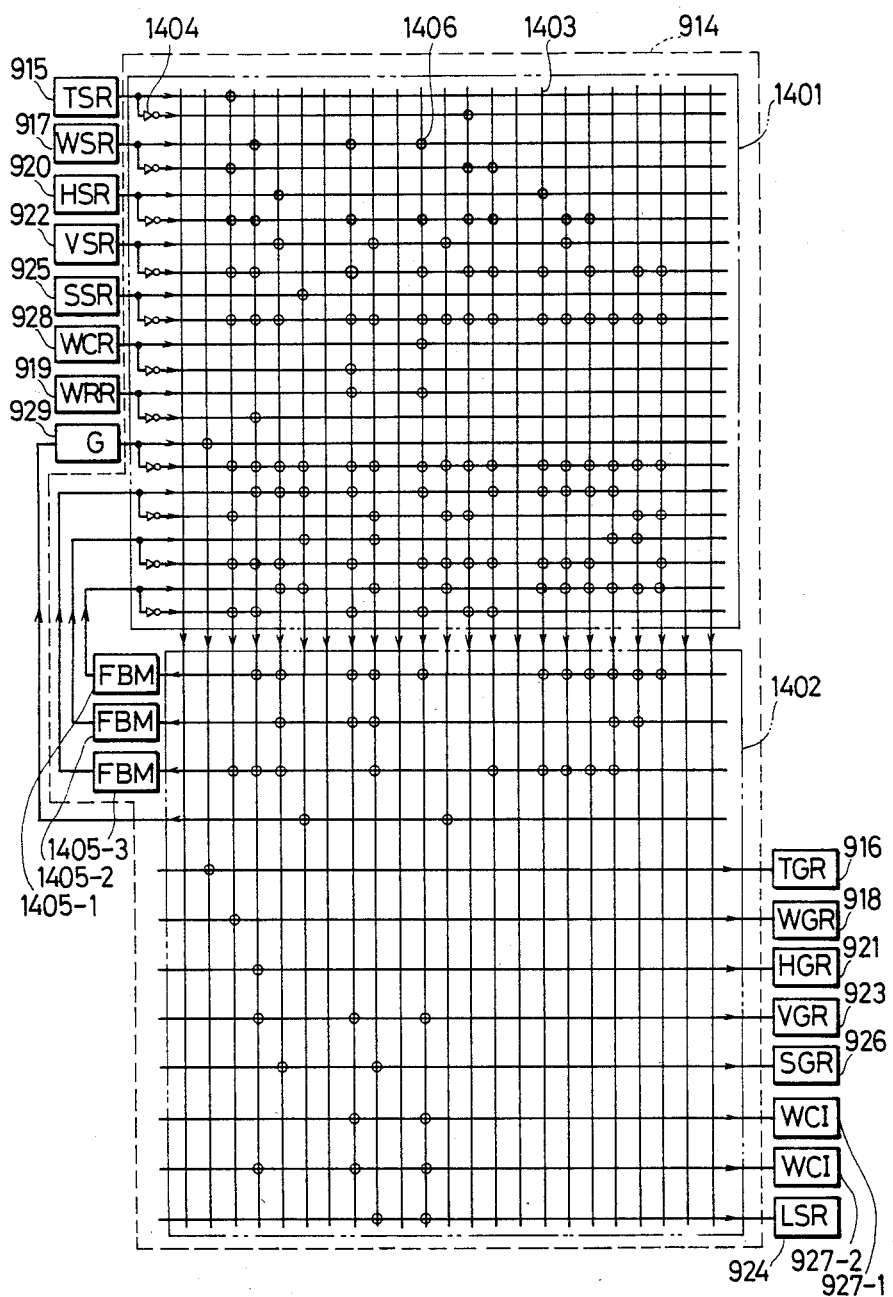
FIG. 14 is a block diagram illustrating an example of the arrangement of a sequence control circuit (SCC) 915 in FIG. 9.

FIG. 14 illustrates an example of the sequence control circuit 914 which is formed by a PLA. The contents of the circuit state registers indicating the end of operations of respective circuits, i.e. the registers TSR 915, WSR 917, HSR 920, VSR 922 and SSR 925 and the registers WCR 928, WRR 919 and the contents of an internal state feedback memories 1405-1, 1405-2 and 1405-3 of the PLA are provided to an and AND array 1401. The AND output of the AND array 1401 is provided to an OR array 1402, the outputs of which are applied to the circuit trigger registers TGR 916, WGR 918, HGR 921, VGR 923 and SGR 926, the registers WCI 927-1, 927-2, LSR 924 and the internal state feedback memories 1405-1, 1405-2, 1405 of the PLA. There are provided product term lines (vertical lines) 1403 in common to the arrays 1401 and 1402. Each input to the AND array 1401 is applied thereto directly and also via a NOT circuit 1404. The internal states of the PLA are stored in the feedback memories 1405-1 to 1405-3. Crosspoints for producing logical products or sums in the PLA are identified by circles 1406. One of the output lines of the OR array 1402 is connected to the trigger pulse generator 929, the output of which is applied to the AND array 1401.

Operation

Next, a description will be given of the operations of the circuits shown in FIGS. 9 to 14. For convenience of description, let it be assumed that the pattern memory 901 has stored therein the binary image signal shown in FIG. 1, that the horizontal and vertical pel-number memories 905 and 907 have stored therein M=248 and N=204, respectively, and that the codes shown in FIG. 7 are provided to the code memory 912 in accordance with the flowchart depicted in FIG. 8. To initiate the coding of the binary image signal, the trigger pulse generator 929 produces in response to an external signal, a pulse "1" and the white line continuing flag register 928 is preset to "0". By the pulse generated from the trigger pulse generator 929, the registers 915 and 917 to 926 are set to "0" through means not shown, performing initialization of the coding process for one line of the binary image signal.

In response to the pulse "1" from the trigger pulse generator 929, the transfer circuit trigger register 916 is set to "1" by the sequence control circuit 914 shown in FIG. 14, activating the transfer circuit 903. The transfer circuit 903 inputs a first line image signal from the pattern memory 901 and stores the first line pattern signal in the line buffer 902. Upon completion of the operation of the transfer circuit 903, the transfer circuit state register 915 goes to "1". At this time, since the output of the trigger pulse generator 929 has turned to "0" and the feedback memories 1405-1 to 1405-3 and the registers 917, 920, 922 and 925 are in "0" state, the content "1" of the transfer circuit state register 915 causes to provide via the control circuit 914 "1" to each of the feedback memory 1405-3 and the white line detector trigger flag register 918 at the next time stage. By the setting of the register 918, the white line detector 904 is activated to detect whether the line image signal in the line buffer 902 is a white line or not. Since the first line is not white line, the white line detector 904 sets the white line detected result register 919 to "0" state and sets an operation end flag "1" in the white line detector state register 917. In consequence, the white line detected result register 919 is in "0" state, the white line detector state register 917 are in "1" state, the feedback memories 1405-1 to 1405-3 are in "0" state, "0" state and "1" state, respectively, and the registers 920, 922 are all in "0" state. Therefore, the sequence control circuit 914 sets, at the next time stage, the feedback memories 1405-1 and 1405-3 and the registers (HGR) 921, (VGR) 923 and (WCI) 927-2 to "1" state and sets the other circuits to "0" state. By the setting of the horizontal circuit trigger flag register 921 to "1" state, the horizontal code generator 906 is activated, and by the setting of the vertical circuit trigger register 923 to "1" state, the vertical code generator 908 is activated.

By "1" state of the horizontal circuit trigger flag register 921, the HCG sequence control circuit 1010 in FIG. 10 starts the run position detector 1001 to read out the run buffer 902. Since a first run of the first line is white, the HCG sequence control circuit 1010 activates the run position normalizing circuit RPNC 1003 to provide $0 = p_0^0$ to the normalized run position buffer 1004. At the same time, the run position detector 1001 detects the next run position 35 ($= n_1^0$) from the line buffer 902 and applies the white dot number 35 to the run position buffer 1002. Next, the RPNC 1003 carries out a division 35/248, where 248 ($=N$) is the content of the horizontal pel-number memory 905 and 35 ($= n_1^0$) is the content of the run position buffer 1002, and provides the division result 0.0010010000 ($= p_1^0$) to the normalized run position buffer 1005. Next, the subtractor 1006 supplies the relative normalized run position buffer 1007 with a difference 0.0010010001 ($= B_1^0 = p_1^0 - p_0^0$) between the contents of the normalized run position buffers 1005 and 1004. Next, the encoder 1008 encodes the content 0.0010010001 of the relative normalized run position buffer 1007, in accordance with the code table stored in the code table memory 1009, into a code 111111100010001 ($= <\overline{B}_1^0<$), which is provided to the horizontal code memory 909.

Next, the RPNC 1003 outputs $p_1^0$ to the normalized run position buffer 1004, and the run position detector 1001 starts to detect the next run position stored in the line buffer 902. The run position detector 1001 outputs the next run position 145 ($= n_2^0$) to the run position buffer 1002. Next, the RPNC 1003 calculates a division 145/248 and provides the division result 0.1001010110 ($= p_2^0$) to the normalized run position buffer 1005. Next, the subtractor 1006 supplies the relative normal-ized run position buffer 1007 with a difference 0.0111000110 ($= B_2^0 = p_2^0 - p_1^0$) between the contents of the normalized run position buffers 1005 and 1004. Next, the encoder 1008 encodes the contents of the relative normalized run position buffer 1007 in accordance with the code table stored in the code table memory 1009 and outputs the resulting code $<\overline{B}_2^0> = 1111111011000110$ next to $<\overline{B}_1^0>$ stored in the horizontal code memory 909. Next, the RPNC 1003 outputs $p_2^0$ to the normalized run position buffer 1004, and the run position detector 1001 starts to detect the next run position in the lie buffer 902, after which the above-described operation is repeated, outputting a code $<\overline{B}_3^0> 1111110111100$ next to $<\overline{B}_2^0>$ in the horizontal code memory 909. Next, the RPNC 1003 provides $p_3^0$ to the normalized run position buffer 1004, and the run position detector 1001 starts to detect the next run position in the line buffer 902. Since the run position on the first line does not exist any more in the remaining part of the line image signal stored in the horizontal pel-number memory 905, however, the position detector 1001 provides an operation end signal to the HCG sequence control circuit 1010, which sets the horizontal circuit state register 920 having stored therein an operation end flag of the horizontal code generator 906 to "1" state, completing the operation of the horizontal code generator 906 for the first line.

On the other hand, since the vertical circuit trigger flag register 923 has been set to "1" state, the VCG sequence control circuit 1110 activates the vertical code generator 908. Since the line state register 924 is in "0") state (When the line state register 924 is in "1" state, white lines occur in succession over two or more lines in the vertical code generator 908 and the second and succeeding white lines are stored in the line buffer 902, and only the line position is incremented. This will be described in detail later on.), the VCG sequence control circuit 1110 activates the line position normalizing circuit LPNC 1102. The LPNC 1102 divides the stored content $m_0 = 0$. The zero is prestored before the start of the binary image signal encoding operation) of the line position buffer 1101 by the stored content 204 of the vertical pel-number memory 907 and provides the division result $u_0 = 0.0000000000$ to the normalized line position buffer 1104. Next, the VCG sequence control circuit 1110 activates the subtractor 1105 obtains a difference between the stored content "0" (which is generally $u_j'$, but a 0 has been prestored before starting the binary image signal encoding operation) of the normalized line position buffer 1103 and the stored content $u_0$ of the normalized line position buffer 1104, i.e. $D_0 = u_0 - 0 = 0.0000000000$, and the difference thus obtained is provided to the relative normalized line position buffer 1106. Next, the encoder 1107 derives $<\overline{D}_0> = 00$ from the stored content $D_0$ of the relative normalized line position buffer 1106 in accordance with the code table stored in the code table memory 1108 and applies it to the vertical code memory 910. Next, the VCG sequence control circuit 1110 activates the line position increment circuit 1109 to increment the content of the line position buffer 1101 by 1 to 1 ($= m_1$). By this, the LPNC 1102 is activated to provide $u_0$ to the normalized line position buffer 1103, setting the vertical circuit state register 922, which is an operation end flag of the vertical code generator 908, to "1" state, completing the operation of the vertical code generator 908. The horizontal circuit state register 920 and the vertical circuit state register 922 go to "1" state, the feedback memories 1405-1 to 1405-3 are in "1" state, "0" state and "1" state, respectively, and the register 925 and the generator 929 are both in "0" state, so that the sequence control circuit 914 sets, at the next time stage, the feedback memories 1405-1 to 1405-3 all to "1" state, setting the synthesizing circuit trigger flag register 926 to "1" state. On the other hand, since the white line continuing state registers 927-1 and 927-2 are in "0" state and in "1" state, respectively, the contents 0 of the feedback memory 1305 of the white line continuing state circuit 913 and the white line continuing flag register 928 in FIG. 13 remain unchanged.

Now, upon setting of the synthesizing circuit trigger flag register 926 to "1" state, the SC sequence control circuit 1208 in FIG. 12 activates the operation of the synthesizing circuit 911. Since the line state register 924 is in "0" state (When the line state register 924 is in "1" state, the synthesizing circuit 9 11 starts the white line header adder 1206 for adding the white line header.), the SC sequence control circuit 1208 activates the transfer circuit 1201, by which $<\overline{B}_1{}^0>1$ $<\overline{B}_2{}^0>$ and $<\overline{B}_3{}^0>$ in the horizontal code memory 909 and $\overline{D}_0$ in the vertical code memory 910 are transferred in the form of $\overline{D}_0\,\overline{B}_1{}^0\,\overline{B}_2{}^0\,\overline{B}_3{}^0$ to the code memory 1202. Next, the code length calculator 1203 calculates the code length (the length in bytes) of the code stored in the code memory 1202 and outputs "6" (bytes), in this example, to the code length memory 1204. Next, the header adder 1205 adds a header 00000110 at the head of the code train stored in the code memory 1202 and pads one bit "1" to the last of the code train, thereafter providing the code train of the first line in FIG. 7 to the code memory 912. At the same time, the SC sequence control circuit 1208 sets the synchronizing circuit state register 925, which is an operation end flag of the sequence control circuit 911, to "1" state.

Now, the synthesizing circuit state register 925 is in "1" state, the feedback memories 1405-1 to 1405-3 are all in "1" state and the output of the generator 929 is in "0" state, so that the sequence control circuit 9 14 provides, at the next time stage, "1" to the trigger pulse generator 929 to generate a pulse "1" in FIG. 14, starting encoding of the second line of the binary image signal. The pulse "1" from the trigger pulse generator 929 again resets the registers 915 and 917 to 926 to "0" state. Next, a description will be given of the encoding of the second line in FIG. 1.

At first, in response to the pulse "1" generated by the trigger pulse generator 929, the sequence control circuit 914 sets all the feedback memories 1405-1 to 1405-3 to "0" state and the transfer circuit trigger flag register 916 to "1" state and makes the other outputs of the OR array 1402 "0". Owing to "1" state of the transfer circuit trigger flag register 916, the transfer circuit 903 transfers the image signal of the second line from the pattern memory 901 to the line buffer 902 and, upon completion of the transfer, the transfer circuit state register 915 is set to "1" state. By the setting of the transfer circuit state register 9. 15 to "1" state, the sequence control circuit 914 sets the feedback memory 1405-3 and the white line detector trigger flag register 918 to "1" state at the next time state in the same manner as described previously. Upon setting of the flag register 918 to "1" state, the white line detector 904 starts its operation. Since the second line is a white line, the white line detector 904 sets the white line detection result register 919 to "1" state, setting the white line detector state register 9 17, which is an operation end flag of the white line detector 904, to "1" state. Thus, the feedback memories 1405-1 to 1405-3 are in "0" state, in "0" state and in "1" state, respectively, the white line detection result register 919 and the white line detector state register 917 are both in "1" state and the white line continuing flag register 928 and the registers 920, 922, 925 and 927 are all line "0" state, so that at the next time state, the sequence control circuit 914 sets the feedback memories 1405-1 to 1405-3 to "1" state, "1" state and "0" state, setting the vertical circuit trigger flag register 923 to "1" state and both of the white line continuing state registers 927-1 and 927-2 to "1" state.

Upon setting of the vertical circuit trigger flag register 923 to "1", the vertical code generator 908 starts its operation. Since the line status register 924 is in "0", the VCG sequence control circuit 1110 activates first the line position normalizing circuit LPNC 1102 to conduct an operation 1/204 on the basis of the stored content 204 of the vertical pel-number memory 907 and the stored content $m_1 = 1$ of the line position buffer 1101 and provides the divided output $u_1 = 0.00000000101$ to the normalized line position buffer 1104. Next, the VCG sequence control circuit 1110 activates the subtractor 1105 to obtain a difference, $D_1 = u_1 - u_0$, between the stored content $u_0$ of the normalized line position buffer 1103 and the stored content $u_1$ of the normalized line position buffer 1104, and the resulting difference $D_1 = 0.0000000101$ is provided to the relative normalized line position buffer 1106. Next, the encoder 1107 obtains a code $<\overline{D}_1> = 11001$ from the stored content $D_1$ of the relative normalized line position buffer 1106 in accordance with the code table stored in the code table memory 1108, and provides the code $<\overline{D}_1>$ to the vertical code memory 910. Next, the VCG sequence control circuit 1110 activates the line position increment circuit 1109 to increment the content of the line position buffer 1101 by 1 to make it $m_2 = 2$. As a result of this, the LPNC 1102 is activated to provide the stored content $u_1$ of the normalized line position buffer 1104 to the normalized line position buffer 1103, and the vertical circuit state register 922 which is an operation end flag of the vertical code generator 908 to "1", completing the operation of the vertical code generator 908.

On the other hand, since the white line continuing state registers 927-1 and 927-2 are both in "1" state, the white line continuing state circuit 913 sets the feedback memory 1305 to "1" and the white line continuing flag register 928 to "1". By the setting of the vertical circuit state register 922 to "1" state, the feedback memories 1405-1 to 1405-3 to "1", "1" state and "0", respectively, and the register 925 to "0", the sequence control circuit 914 sets, at the next time stage, the feedback memories 1405-1 to 1405-3, the synthesizing circuit trigger flag register 926 and the line state register 924 all to "1".

Owing to "1" of the register 926, the synthesizing circuit 911 starts its operation. Since the line state register 924 is in "1" state, the SC sequence control circuit 1208 activates the white line header adder 1206 to synthesize the stored content $<\overline{D}_1>$ of the vertical code memory 910 and the white line header 00000000 stored in the white line header memory 1207. In this case, the code train is padded at the end thereof with three is to terminate with a byte boundary. Then the code train of the second line, thus obtained, is applied to the code memory 912. At the same time, the SC sequence control circuit 1208 sets the synthesizing circuit state register 925, which has stored the operation end flag of the synthesizing circuit 911, to "1", completing its operation.

Since the synthesizing circuit state register 925 and the feedback memories 1405-1 to 1405-3 are all in "1" state, the sequence control circuit 914 provides "1" to the trigger pulse generator 929 to generate a pulse "1" at the next time stage, starting the coding of the third line of the binary image signal. At this time, the registers 915 and 917 to 926 are set to "0" by the generation of the pulse from the trigger pulse generator 929. Next, a description will be given of the coding of the third line shown in FIG. 1. At first, upon generation of the pulse by the trigger pulse generator 929, the transfer circuit trigger flag register 916 is set to "1" to activate the transfer circuit 903, transferring to the line buffer 902 the image signal of the third line stored in the pattern memory 901. Then the white line detector 904 is activated, by the setting of the white line detector trigger flag register 918 to "1", to detect that the line signal in the line buffer 902 is not a white line, setting the white line detection result register 919 to "0". Now that the register 919 is in "0" state, the white line detector state register 917 in "1" state and the feedback memories 1405-1 to 1405-3 in "0" state, "0" state and "1" state, respectively, the horizontal circuit trigger flag register 921 and the vertical circuit trigger flag register 923 are put to "1" state at the next time stage, setting the white line continuing state registers 927-1 and 927-2 to "0" and "1", respectively. By the setting of the horizontal circuit flag register 921 to "1", the horizontal code generator 906 is started, which repeats the same operation as described previously in connection with the first line. In this case, the horizontal code generator 906 provides $<\overline{B}_1^2> = 1111110111100$ and $<\overline{B}_2^2> = 11111111001001010$ to the horizontal code memory 909, setting the horizontal circuit state register 920 to "1" to complete the operation of the horizontal code generator 906. On the other hand, by the setting of the vertical circuit trigger flag register 923 to "1", the vertical code generator 908 is activated, which repeats the same operation as that for the first and second lines and in which $u_2$ is provided to the normalized line position buffer 1103 and the stored content of the normalized line position buffer 1101 is incremented to 3, and the vertical code generator 908 outputs $<\overline{D}_2> = 11001$ to the vertical code memory 910, thus completing the operation of the vertical code generator 908.

Since the white line continuing state registers 927-1 and 927-2 are in "0" state and "1" state, respectively, the feedback memory 1305 of the white line continuing state circuit 913 is altered to "0" and the white line continuing flag register 928 is also set to "0". Upon completion of the operation of the horizontal and vertical code generators 906 and 908, the synthesizing circuit trigger flag register 926 is put to "1" state to activate the synthesizing circuit 911. The synthesizing circuit 911 repeats the same operation as that for the first line and provides a code train of the third line in FIG. 7 to the code memory 912. Upon completion of the operation of the synthesizing circuit 911, the trigger pulse generator 929 generates a pulse "1" and the fourth and subsequent lines are encoded in the same manner as described above, finally obtaining the code train of FIG. 7 in the code memory 912.

Next, a description will be given of the case where the third line in FIG. 1 is also a white line after the second line. When encoding of the second line is completed, the white line continuing flag register 928 and the feedback memory 1305 are both in "1" state. At first, by the generation of a pulse "1" from the trigger pulse generator 929, the transfer circuit 903 is activated to transfer the white third line from the pattern memory 901 to the line buffer 902. Next, the white line detector 904 is activated to detect that the third line is a white line, setting the white line detection result register 919 to "1", whereby completing the operation of the white line detector 904. Then, since the white line continuing flag register 928 and the white line detection result register 919 are both in "1" state, the white line detector state register 917 in "1" state, and the feedback memories 1405-1 to 1405-3 in "0" state, "0" state and "1" state, respectively, and the registers 920, 922, 925 and 926 all in "0" state, the sequence control circuit 914 sets, at the next time stage, the feedback memories 1405-1 to 1405-3 to "1", "0" and "0", respectively, the vertical circuit trigger flag register 923 to "1", the white line continuing state registers 927-1 and 927-2 both to "1" and the line state register 924 to "1".

Since the white line continuing state registers 927-1 and 927-2 are both in "1" state, the feedback memory 1305 of the white line continuing state circuit 913 and the white line continuing flag register 928 remain in "1" state. On the other hand, the vertical code generator 908 is activated by the setting of the vertical circuit flag register 923. At this time, since the line state register 924 is in "1" state, the VCG sequence control circuit 1110 starts the line position increment circuit 1109 to increment the line position in the line position buffer 1101 by one, setting the vertical circuit state register 922 to 1"1" state, completing the operation of the vertical code generator 908. Based on "1" of the vertical circuit state register 922, "0" of the register 925 and the generator 929 and "1", "0" and "0" state of the feedback registers 1405-1 to 1405-3, the sequence control circuit 914 sets the trigger pulse generator 929 to generate a pulse at the next time stage, starting the encoding of the next fourth line. Accordingly, even if white lines occur in succession, the second and subsequent white lines are not encoded; in other words, a skip process takes place.

Next, a description will be given of the operation of the horizontal code generator 906 in the case where the foremost run of a certain line is a run of black pels. The foremost run in the line buffer 902 starts with a black pel, and when the run position detector 1001 detects the run position, the HCG sequence control circuit 1010 immediately activates the encoder 1008, providing a code 00 to the horizontal code memory 909. Next, the run position normalizing circuit RPNC 1003 is activated to apply "0" to the normalized run position buffer 1004, and the run position detector 1001 is activated to start the detection of the next run position, providing a code $<B_j>$ to the horizontal code memory 909 next to the code 00. For instance, when a certain line consists only of black pels, the horizontal code generator 906 only provides the code 00 to the horizontal code memory 909, whereby completing the operation of the horizontal code generator 906.

<Second Embodiment>

Figure 15A:
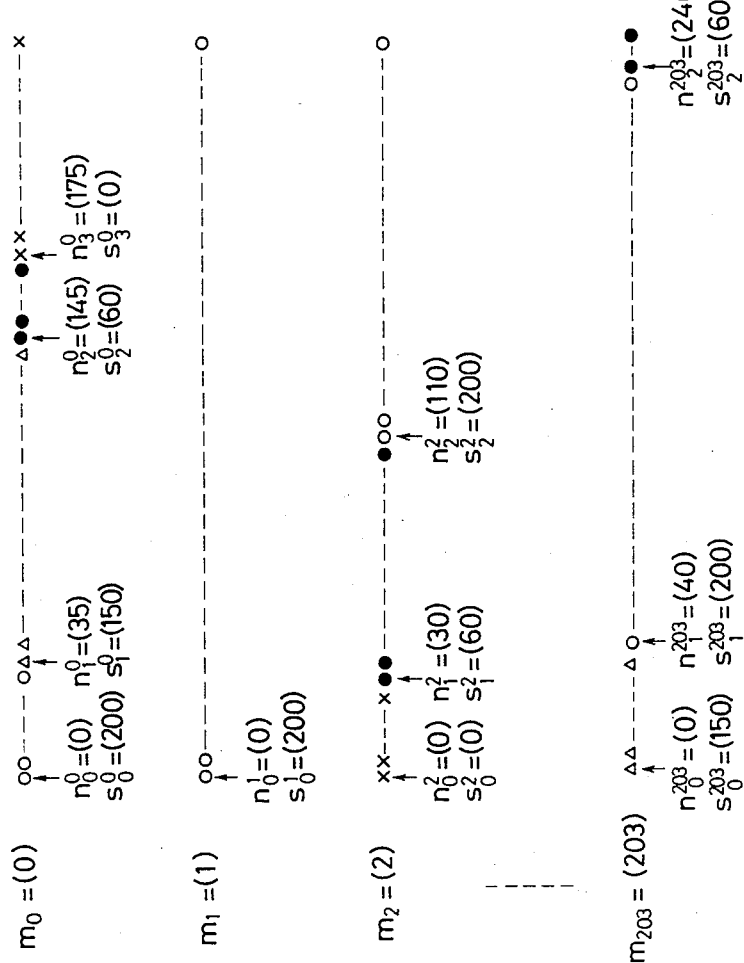
FIG. 15A is a diagram showing, by way of example, a gray scale image, its run positions, line positions and pel values.

In the foregoing the present invention has been described as being applied to the binary image signal. Now a description will be given of another embodiment of the invention as being applied to a multilevel image signal, that is, a gray scale image signal. An example of the multilevel image is shown in FIG. 15A. In FIG.

15A symbols o, Δ and x indicate pels of different pel values, which are each represented by $s_j{}^i$.

Figure 15B:
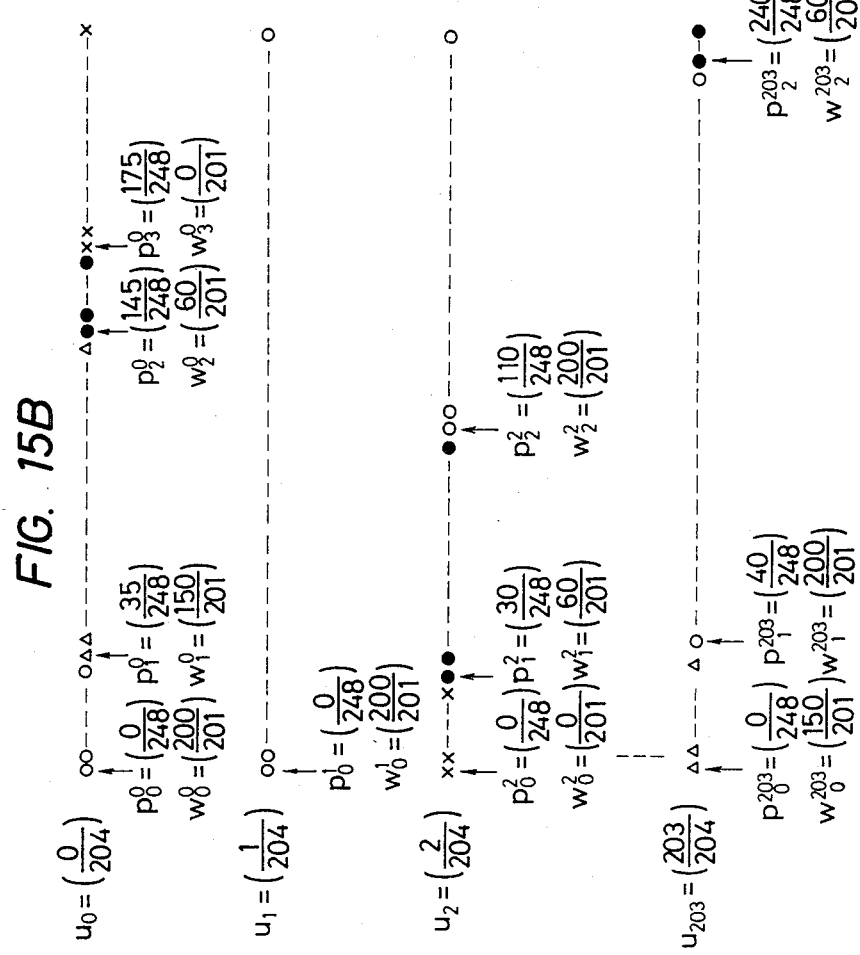
FIG. 15B is a diagram showing, by way of example, the normalization of the run positions, line positions and pel values shown in FIG. 15(A).

The pel value of each pel relates to the optical density of the pel. As is the case with the binary image signal, the line position $m_j$ is normalized to obtain a normalized line position $u_j = m_j/M$, and a difference between the normalized line position $u_j$ of a coding line and a normalized line position $u_{j'} = m_{j'}/M$ ($0 \leq j' \leq b$) of an immediately preceding coded is calculated to obtain a relative normalized line position $D_j = u_j - u_{j'}$. Moreover, a run position $n_j{}^i$ where the pel value changes on the same line is normalized to obtain a normalized run position $p_j{}^i = n_j{}^i/N$. Further, a difference between adjacent normalized run positions is calculated to obtain a relative normalized run position $B_j{}^i = p_j{}^i - p_{i-1}{}^i$. In the multilevel image signal, the pel value $s_j{}^i$ ($0 \leq s_j{}^i < S$, where S is a number of levels, that is, a number of different pel values which each pel can assume > of each pel forming each run is divided by S to obtain a normalized pel value $w_j{}^i = s_j{}^i/S$. In the case of FIG. 15A, the value of S is 201, for example. FIG. 15B shows normalized line positions, normalized run positions and normalized pel values obtained in connection with the multilevel image depicted in FIG. 15A. These normalized line positions and normalized run positions are each represented by a binary decimal of 10 digits below the decimal point, counting fractions of 1 as a unit and disregarding 0 at the 11th decimal place. The normalized pel value $w_j{}^i$ is represented by a binary decimal of eight digits below the decimal point, counting fractions of 1 as a unit and disregarding 0 at the ninth decimal place, and it is represented by $C_j{}^i$.

The relative normalized line position $D_j$, the relative normalized run position $B_j{}^i$ and the normalized pel value $C_j{}^i$ are respectively encoded into codes $<\overline{D}_j>$, $<\overline{B}_j{}^i>$ and $<\overline{C}_j{}^i>$. For encoding the relative normalized line position $D_j$ and the relative normalized run position $B_j{}^i$ are used the code tables such, for example, as shown in FIGS. 4 and 5, respectively. FIG. 16 shows an example of the correspondence between the normalized pel value $C_j{}^i$ and its code $<\overline{C}_j{}^i>$. In FIG. 16, l indicates the number of significant digits and l = 8 in the above example. For example, the code $<\overline{C}_2{}^0>$ of the normalized pel value $C_2{}^0 = 0.01001100$ is 01001100.

The codes thus obtained are output line by line and, at this time, as is the case with the binary image signal, a header $<H_j>$ indicating the code length of the line is placed at the forefront of the code train and is followed by the code $<\overline{D}_j>$ and then by sets of the codes $<\overline{C}_j{}^i>$ and $<\overline{B}_j{}^i>$, as shown in FIG. 17. When one line consists entirely of pels of the same ple value, the header $<H_j> = <(00)_{16}>$ is followed by $<\overline{D}_j>$ and $<\overline{C}_a{}^i>$. When the code train of one does not terminates with a byte boundary, a required number of padding bits "1" are added.

Figure 18:
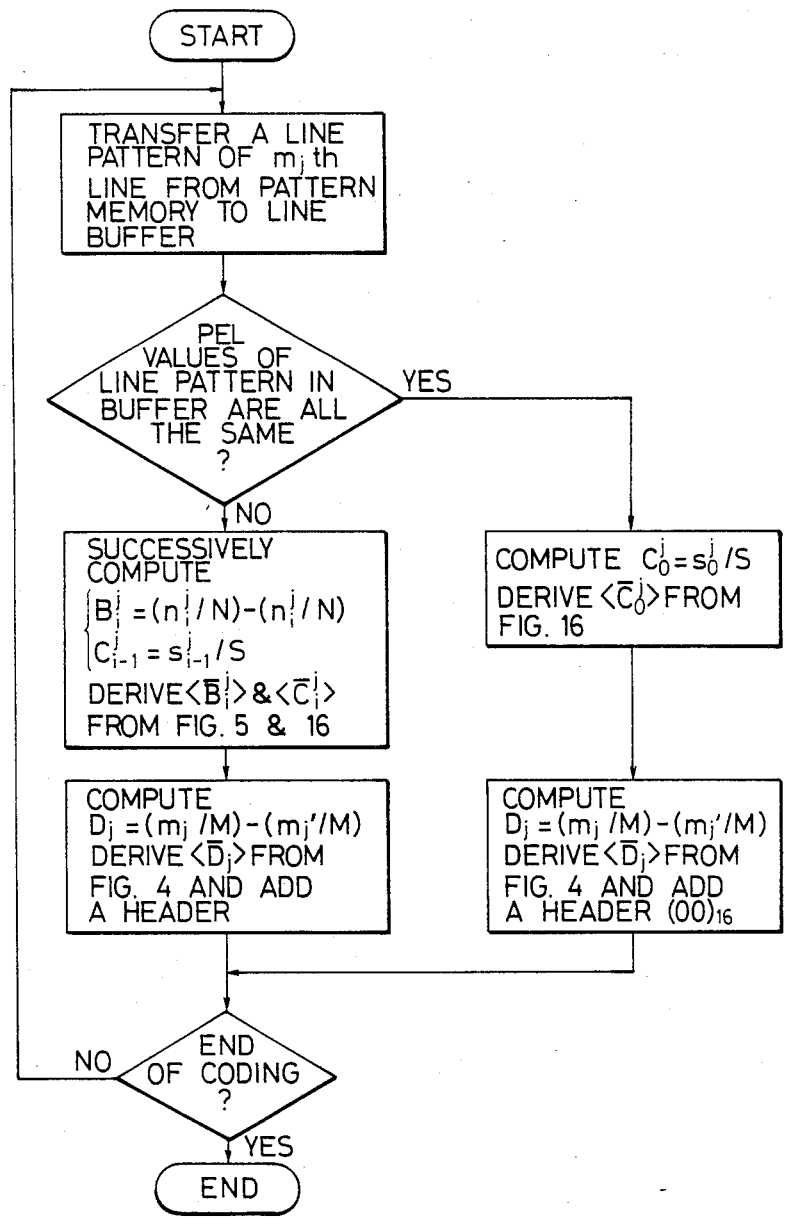
FIG. 18 is a flowchart illustrating an example of the operation for encoding the gray scale image signal.

FIG. 18 shows a flowchart illustrating an example of the operation for encoding the multilevel image signal.

Figure 19:
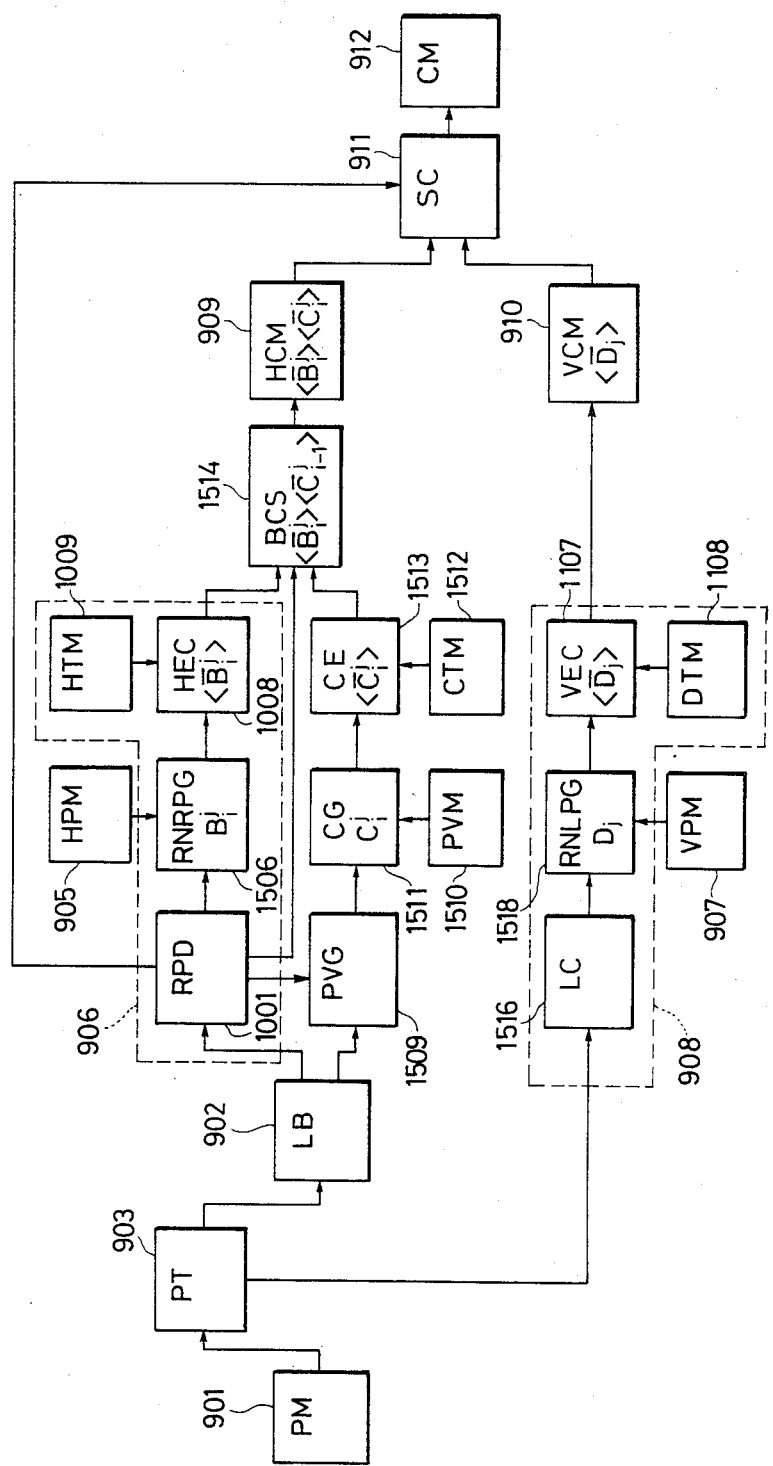
FIG. 19 is a block diagram illustrating an example of the arrangement of the present invention as being applied to the encoding of the gray scale image signal.

FIG. 19 illustrates an example of the arrangement of a multilevel image signal coding system. For convenience of description, let it be assumed that a pattern memory (PM) 901 has stored therein the multilevel image signal shown in FIG. 15A, that a horizontal pel-number memory (HPM) 905, a pel value memory (PVM) 1510 and a vertical pel-number memory (VPM) 907 have stored therein 248, 201 and 204, respectively, and that code table memories (HTM) 1009, (CTM) 1512 and (DTM) 1108 have stored therein the code tables shown in FIGS. 5, 16 and 4, respectively.

A description will be given, with reference to FIG. 18, of the process for encoding the multilevel image signal stored in the pattern memory (PM) 901 for output to a code memory (CM) 912.

At first, a line pattern transfer circuit (PT) 903 transfers the line pattern signal (an image signal for one line) of a first line of the multilevel image signal in the pattern memory (PM) 901 to a line buffer (LB) 902 and, at the same time, yields a count signal pulse. The transfer circuit 903 generates one count signal pulse for each line transfer. A run position detector (RPD) 1001 detects the run position of the multilevel image signal in the line buffer (LB) 902 and outputs 23 ($= n_1{}^0$), which is temporarily stored for use in a pel value generator (VG) 1509. A $B_j{}^i$ generator (a relative normalized run position generator: RNRPG) 1506 conducts a division 35/248 on the basis of the output 35 ($= n_1{}^0$) of the run position detector 1001 and the stored content 248 ($= N$) of the horizontal pel-number memory (NM) 905, counting fractions of 1 as a unit and disregarding 0 at the 11th decimal place, to obtain 0.0010010001 ($p = p_1{}^0$) and then obtains a difference $B_1{}^0 = p_1{}^0 - p_1{}^0$ where $p_0{}^0 = 0.0000000000$: an initial value, outputting 0.0010010001 (at this time, $p_1{}^0$ is temporarily stored). Then a $B_j{}^i$ encoder (HEC) 1008 receives the output $B_1{}^0 = 0.0010010001$ of the $B_j{}^i$ generator (RNRPG) 1506 and outputs a code $<\overline{B}_1{}^0> = 111111100010001$ since $b_1 = b_2 = 0$ and $b_3 = 1$ according to the code table stored in the memory (HTM) 1009. Simultaneously with the operation through the detection of the run position $n_1{}^0$ to the outputting of $<\overline{B}_1{}^0>$, the pel value generator (PVG) 1509 detects and outputs the pel value 200 ($= s_0{}^0$) of a zeroth ($= n_0{}^0$) pel in the line buffer (LB) 902 on the basis of the initial value 0 ($= n_0{}^0$) stored in the run position detector (RTD) 1001. A $C_j{}^i$ generator (CG) 1511 conducts an operation 200/201 on the basis of the output 200 ($= s_0{}^0$) of the pel value generator (VG) 1509 and the stored content 201 ($= S$) of the pel value memory (SM) 1510, counting fractions of 1 as a unit and disregarding 0 at the ninth decimal place, to output 0.11111111 ($= w_0{}^0 = C_0{}^0$). A $C_j{}^i$ encoder (CE) 1513 outputs a code $<\overline{C}_0{}^0> = 11111111$ in accordance with the code table stored in the memory (CTM) 1512. Next, a code synthesizing circuit (BCS) 1514 combines the output $<\overline{B}_1{}^0> = 111111100010001$ of the $B_j{}^i$ encoder (HEC) 1008 and the output $<\overline{C}_0{}^0> = 11111111$ of the $C_j{}^i$ encoder (CE) 1513 into a code 111111111100010001 ($= <\overline{C}_0{}^0><\overline{B}_1{}^0>$), which is stored in horizontal code memory (HCM) 909.

Next, the run position detector 1001 detects the next run position in the line buffer 902, and the same operation as described above are carried out to provide a code $<\overline{B}_1{}^0> = 11111111011000110$. Further, the pel value $s_1{}^0 = 150$ of a 35 ($= n_1{}^0$)th pel in the line buffer 902 is detected and an operation 150/201 is carried out to obtain $C_1{}^0 = 0.10111111$, outputting a code $<\overline{C}_1{}^0> = 10111111$. Next, the code synthesizing circuit (BCS) 1514 combines these codes to provide a composite code 10111111111111011000110 ($= <\overline{C}_1{}^0><\overline{B}_2{}^0>$), which is stored in the horizontal code memory (HCM) 909. Similarly, a line position 175 ($= n_3{}^0$) and a pel value 60 ($= s_2{}^0$) are detected and their composite code 010011001111110111100 ($= <\overline{C}_2{}^0><\overline{B}_3{}^0>$) is stored in the horizontal code memory (HCM) 909. Next, the run position detector (RPD) 1001 starts its operation for detecting the next run position in the line buffer (LB) 902 but, since there is no more run position, the line buffer 902 outputs a terminating signal, initializing the run position detector (RPD) 1001 and the $B_j$ generator (RNRPG) 1506. At the same time, the pel value generator (PVG) 1509 detects the pel value $s_3^0=0$ of a 175th pel in the line buffer (LB) 902 on the basis of $n_3^0$ 175 stored in the run position detector (RPD) 1001, and a code $<\overline{C}_3^0>=00000000$ is obtained by the $C_j$ generator (CG) 1511 and the $C_j$ encoder (CE) 1513. The code synthesizing circuit (BCS) 1514 responds to the pulse of the terminating signal to provide the output $<\overline{C}_3^0>=00000000$ of the $C_j$ encoder (CE) 1513, which is stored in the horizontal code memory (HCM) 909.

In parallel to the operation of encoding the image signal of one line in the line buffer (LB) 1102 a line counter (LC) 1516 increments its internal counter by 1 by the pulse which is the count signal from the line pattern transfer circuit (PT) 903 to make its count value a 0 (For this, it is necessary to set the initial value of the counter to $-1$.), outputting the count value 0 ($=m_0$). Next, a $D_j$ generator (a relative normalized line position generator: RNLPG) 1518 performs an operation 0/204 on the basis of the output 0 ($=m_0$) of the line counter (LC) 1516 and the stored content 204 ($=M$) of the vertical pel-number memory (VPM), counting fractions of 1 as a unit and disregarding 0 at the 11th decimal place of a binary decimal, by which $u_0=0.0000000000$ is obtained. Further, a difference $u_0-0$, where 0 is an initial value, is obtained to output $D_0=0.0000000000$. At this time, $u_0$ is temporarily stored. Next, a $D_j$ encoder (VEC) 1107 receives the output $D_0=0.0000000000$ of the $D_j$ generator (RNLPG) 1518 and outputs a code $<\overline{D}_0>=00$ since $b_1=\ldots b_{10}=0$ according to the code table stored in the memory (DTM) 1108, and this code $<\overline{D}_0>=00$ is stored in a vertical code memory (VCM) 910. Upon completion of storage of a code train $<\overline{C}_1^0><\overline{B}_1^0>\ldots<\overline{C}_2^0><\overline{B}_3^0><\overline{C}_3^0>$ in the horizontal code memory (HCM) 909, that is, upon completion of encoding of one line and storing of the code $<\overline{D}_0>$ in the vertical code memory (VCM) 910, a synthesizing circuit (SC) 911 combines the code train in the horizontal code memory (HCM) 909 and the code in the vertical code memory (VCM) 910. Since the code length of the composite code train is 79-bit, a header $<H_0>=00001010$ is placed at the forefront of the composite code train, which is then padded with a bit "1" to terimate with a byte boundary. Thus the code train of line is generated and stored in the code memory 912.

Then, the line pattern transfer circuit (PT) 903 transfers the second line in the pattern which is a count signal. The run position detector (RPD) 1001 starts its run position detecting operation but, since there is no run position other than $n_0^1$, which is an initial value, it yields a pulse which is a terminating signal and a pulse which is a line signal. At the same time, the pel value generator (PVG) 1509 obtains the pel value $s_0^1=200$ of a zeroth pel in the line bufer (LB) 902 based on $n_0^1=0$ from the run position detector (RPD) 1001. Then, a code $<\overline{C}_3^1>=11111111$ is obtained through the $C_j$ generator (CG) 1511 and the encoder (CE) 1513, and the code $<\overline{C}_0^1>$ is stored in the horizontal code memory (HCM) 909 via the code synthesizing circuit (BCS) 1514. On the other hand, the line counter (LC) 1516 has its count value incremented by the count signal pulse to $m_1=1$, which is output. Further, a code $<\overline{D}_1>=11001$ is produced through the $D_j$ generator (RNLPG) 1518 and the encoder (VEC) 1107 and is stored in the vertical code memory (VCM) 910. Upon completion of the encoding, the synthesizing circuit 911 adds the header $<H_1>=00000000$ to $<\overline{D}_1><\overline{C}_0^1>$ in response to the line signal pulse from the run position detector (RPD) 1001 and pads with "1" so that the code train terminates with a byte boundary. This code train is stored in the code memory (CM) 912. Further, the pattern of the third line is transferred to the line buffer (LB) 902, and thereafter the above-described operation is repeated down to the 204th line.

In the flow of operation shown in FIG. 18, the encoding is carried out line by line on the assumption that $j'=j-1$ (i.e. $m_{j'}=m_{j-1}$), but that is not necessary. For example, when $m_{j'}+1\leq m_j-1$, if $m_{j'}$ to $m_j$ lines are lines of the same pel value, then it is also possible to omit encoding of the $m_{j'}+1$ to $m_j-1$ lines, to encode a difference $D_j=u_j-u_{j'}$ between a normalized line position $m_j/M$ ($=u_j$) of the $m_j$ line and a normalized line position $m_{j'}/M$ ($=u_{j'}$) encoded immediately before the $m_j$ line and to use the resulting code $<\overline{D}_j>$ as a code of the relative normalized line position of the $m_j$ line in the vertical direction. In other words, a skip process may also be employed. Third Embodiment A color value can also be used as the pel value. FIG. 20 shows examples of pels values of color pels. The color pels of red (R), green (G) and blue (B) components have, for example, Sr, Sq and Sb different pel value (at maximum), respectively. The pel value of the respective color components are normalized into $sr_j/Sr$, $sg_j/Sg$ and $sb_j/Sb$, which are encoded into codes $<\overline{Cr}_j>$, $<\overline{Cg}_j>$ and $<\overline{Cb}_j>$, respectively.

FIG. 21 illustrates, by way of example, code train obtained in the case of the color pel values shown in FIG. 20.

Figure 22:
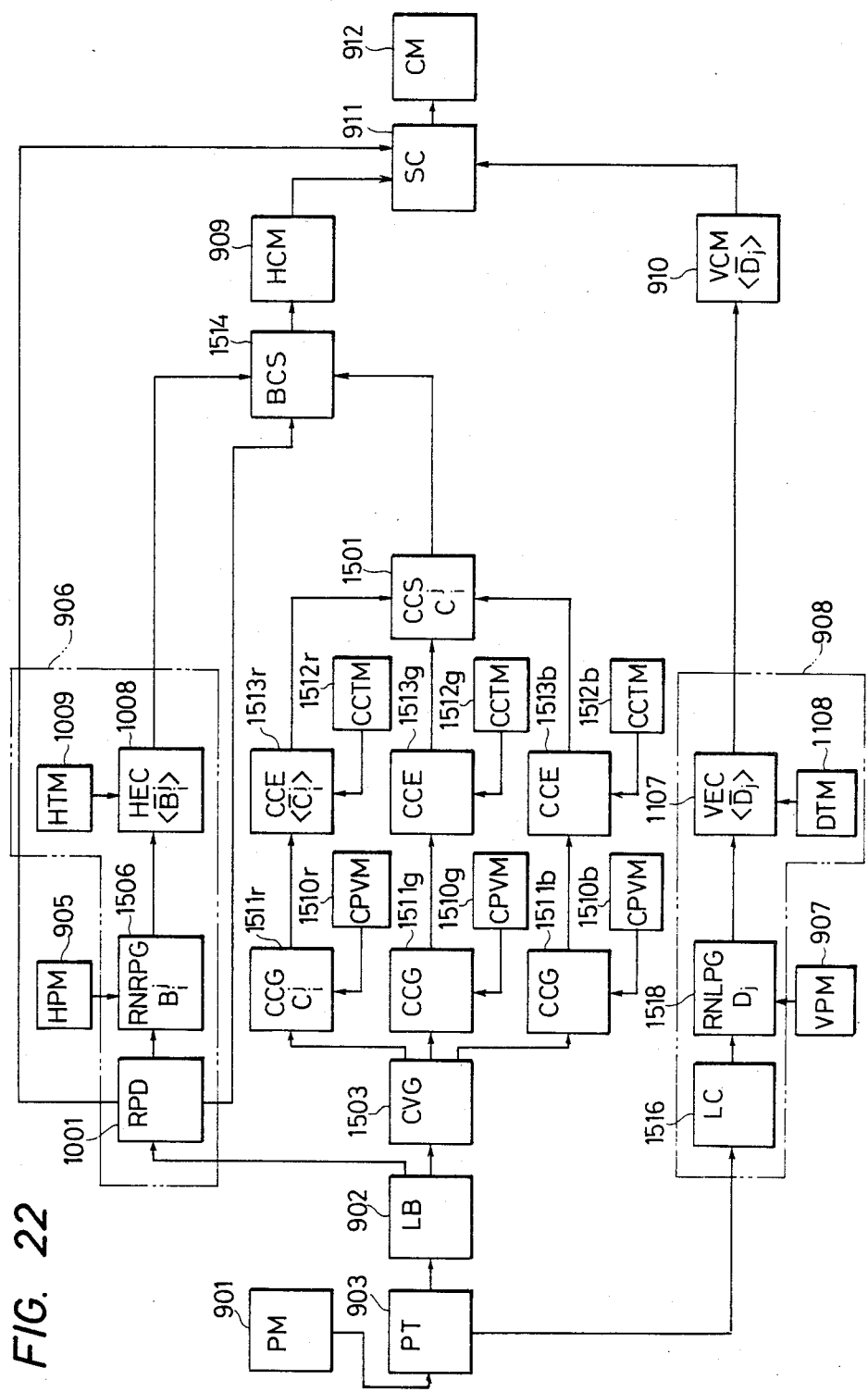
FIG. 22 is a block diagram illustrating an example of the arrangement of the present invention as being applied to the encoding of a color gray scale image signal.

FIG. 22 illustrates an example of the arrangement of the present invention as being applied to the coding of multilevel color image signal. A color pel value generator 1503 detects and outputs color pel values $sr_j$, $sg_j$ and $sb_j$ for the red, green and blue components in a line buffer 902. The color pel values $sr_j$, $sg_j$ and $sb_j$ are stored in color pel value memories 1510r, 1510g and 1510b, respectively. In color $C_j$ generators 1511r, 1511g and 1511b these color pel values are divided by available numbers of color pel values Sr, Sg and Sb (which are integer larger than 0) of the respective color components, calculating normalized color pel values $Cr_j=sr_j/Sr$, $Cg_j=sg_j/Sg$ and $Cb_j=sb_j/Sb$. In code table memories 1512r, 1512g and 1512r are prestored code tables for $Cr_j$, $Cg_j$ and $Cb_j$, respectively. Color encoders 1513r, 1513g and 1513b encode the outputs $Cr_j$, $Cg_j$ and $Cb_j$ of the color $C_j$ generators 1511r, 1511g and 1511b into codes $<\overline{Cr}_j>$, $<\overline{Cg}_j>$ and $<\overline{Cb}_j>$ in accordance with the code tables stored in the memories 1512r, 1512g and 1512b, respectively. These codes are synthesized by a color code synthesizing circuit 1501 into a code train $<Cr_j><Cg_j><Cb_j>$, which is supplied to a synthesizing circuit 1514. The other operations are the same as those in the case of FIG. 19.

Next, a description will be given of other representations of the multilevel color image signal.

FIG. 23 shows an example of a color lookup table, which is a coding lookup table (CLT) in which a suitable set of the codes of red, green and blue pel values ($\overline{C}_{rEK}$, $\overline{C}_{gEK}$, $\overline{C}_{bEK}$) is given at entry value k (where $2\leq k\leq T$). In FIG. 23, $<\overline{C}xy>$, where $x\epsilon\{r, g, b\}$ and $y\epsilon\{E_1, \ldots, E_T\}$, is a code of a binary number Cxy which is the result of an operation of $\alpha/Sx$, where $\alpha$ is the value of the component x and $0\leq\alpha\leq Sx$. Through the use of this table, pels having T kinds of colors is represented on a multilevel image signal.

FIG. 24 shows an example of the code configuration using the color lookup table depicted in FIG. 23. As seen in the first train of codes, the color lookup table is transmitted as a series of codes $<\overline{C}rE_1>$, $<\overline{C}gE_1>$, $<\overline{C}bE_1>$ ... after a heading code $<T>$, and thereafter entry value codes $<E_i^j>$ are used instead of combinations of the three color pel value codes $<\overline{C}r^j><\overline{C}g^j><\overline{C}b^j>$ shown in FIG. 21, permitting further data compression.

Figure 25:
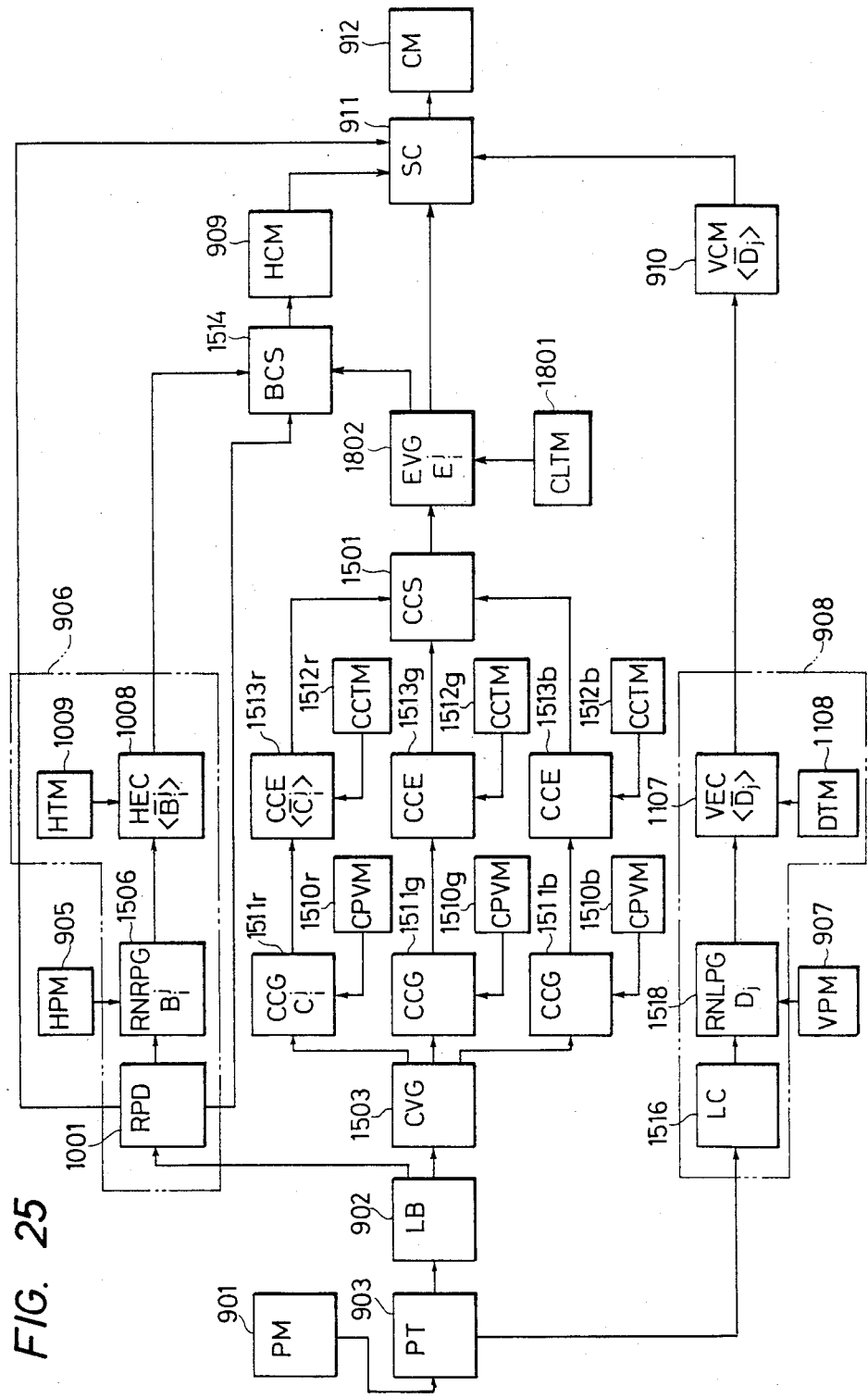
FIG. 25 is a block diagram illustrating an example of the arrangement of the present invention for generating the code train shown in FIG. 24.

FIG. 25 illustrates an example of the arrangement of the present invention as being applied to the generation of the code train depicted in FIG. 24. In a memory 1801 is prestored the look-up table CLT shown in FIG. 23. An entry value generator (EVG) 1802 obtains, by referring to the memory (CLTM) 1801, an entry value $E_i^j$ from the codes $<\overline{C}r^j>$, $<\overline{C}g^j>$ and $<\overline{C}g^j>$ of the pel value of the respective color components which are provided from the color code generator (CCS) 1501. The entry value $<E_i^j>$ is combined by the synthesizing circuit 1514 with the relative normalized run position code $<\overline{B}_i^j>$, thereafter being stored in the horizontal code memory 909. The codes $<E_0^j><\overline{B}_1^j>... >E_{aj-1}><\overline{B}_{aj}^j><\overline{E}_{aj}^j>$ of one line in the horizontal code memory 909 and the code $<\overline{D}_j>$ in the vertical code memory (VCM) 910 are combined by the synthesizing circuit 911 into a composite code, which is added with the padding and is further added with the header $H_j = <(00)_{16}>$ by the line signal pulse from the run position detector (RPD) 1001, thereafter being supplied to the code memory 912. In this case, the synthesizing circuit 911 transfers the contents of the memory (CLTM) 1801 from the entry value generator (EVG) 1802 to the code memory (CM) 912 during initialization. The other operations are the same as those in the case of FIG. 22. The above is a description of the multilevel pattern processing system for color pels. While in FIGS. 22 and 25 red, green and blue color components are used as color pel values, it is also possible to similarly represent other color elements, such as Y, I and Q, by binary numbers for coding.

<Decoding>

In order that the code train encoded by the system of the present invention may be decoded as a multilevel image signal which has a size of M' (number of pels in the vertical direction) × N' (number of pels in the horizontal direction) and a pel value S', these $B_i^j$, $D_j$ and $C_i^j$ are obtained from the codes $<\overline{B}_i^j>$, $<\overline{D}_j>$ and $<\overline{C}_i^j>$ through the use of the code tables, respectively, then $p_i^j$, $u_j$ and $w_i^j (=C_i^j)$ in a sequential order which are respectively multiplied by N', M' and S', thereby obtaining the pel value, the run position and the line position of each run in the multilevel image signal having M'×N' pels and the pel value number S'. In this case, there is no need of M'=M, N'=N and S'=S. Especially, in the case where f≧[log₂N], g≧[log₂M] and l=[log₂S], the encoded multilevel image signal can be reconstructed exactly into the original signal by decoding the multilevel image signal of M'=M, N'=N and S'=S. Further, in the decoding, a new run of a new line can be generated as a suitable pel value by performing an interline interpolating synthesization. The codes $<\overline{B}_i^j>$ and $<\overline{D}_i>$ in the code train of the binary image signal encoded by the present invention can similarly be decoded.

<Examples of Modifications>

In the foregoing the numbers of significant digits f, g and l, the size of a picture M×N and the number of pel values S can be selected arbitrarily. In the code train structure, the header need not always be fixed to one byte, and the header may also represents the code length by bits not by bytes. Also it is possible that a terminate code $<T>$ of one line, that is, a code identifying the termination of one line, is placed at the end of the line, in place of using the header. For example, FIG. 26 shows an example of the use of the terminate code $<T>$. In this case where the number f of significant digits is seven, $B_1^j = 0.1100011$, $B_2^j = 0.0001111$ and $D_j = 0.0000001$ and the code tables shown in FIG. 4 are used for both of the codes $D_j$ and $B_i^j$. In this example, the number of successive 1s in each of the codes $<\overline{D}_j>$ and $<\overline{B}_2^j>$ is a maximum of six, and seven successive 1s are used as the terminate code $<T>$ in distinction from the abovesaid codes. In stand of using a header or a terminating code for determination of the end of each line, it is also possible to encode the relative normalized position of the last pel on each line, i.e. the end of each line, relative to the normalized run position immediately preceding the end of the line. In this case, since the sum total of the relative normalized run positions of each line including the relative normalized position of the last pel becomes 1, the end of the line can be detected by the sum of the decoded normalized run positions which becomes 1.

In the embodiment illustrated in FIG. 9, when white lines occur in succession, normalization of the second to last ones of the consecutive lines, calculation of their relative normalized positions and their encoding are omitted, but it is also possible to omit the normalization of the first line, the calculation of its relative normalized position and its coding, or to perform coding of all the lines.

It is also possible to encode the binary number $B_i^j$ $(=0.b_1b_2...b_{f-1}b_f)$ after rearranging its digits $(b_1, b_2,... b_{f-1}, b_f)$ in a descending order of the occurrence probability $P_{ro}(b_s)$ (s∈1, 2, ... f) to obtain $B'^j_i=(b'_1, b'_2, ... b'_{f-1}, b'_f)$, i.e. $P_{ro}(b'_2)≧...≧P_{ro}(b'_{f-1})≧P_{ro}(b'_f)$. That is, the probability of each bit in digits $(b_1...b_f)$ of the binary number $B_i^j=0.b_1b_2...b_f$ becoming "0" is obtained, and the binary number $(b'_1...b'_f)$ having its bit positions rearranged in the descending order of the probabilities is encoded according to such a code table as shown in FIG. 4. Of course, this is applicable not only to the binary number $b_i^j$ but also to the binary numbers $C_i^j$ and $D_j$. Also it is possible to employ the Huffman coding method according to the values of the binary numbers; namely, the coding method is optional.

Figure 27:
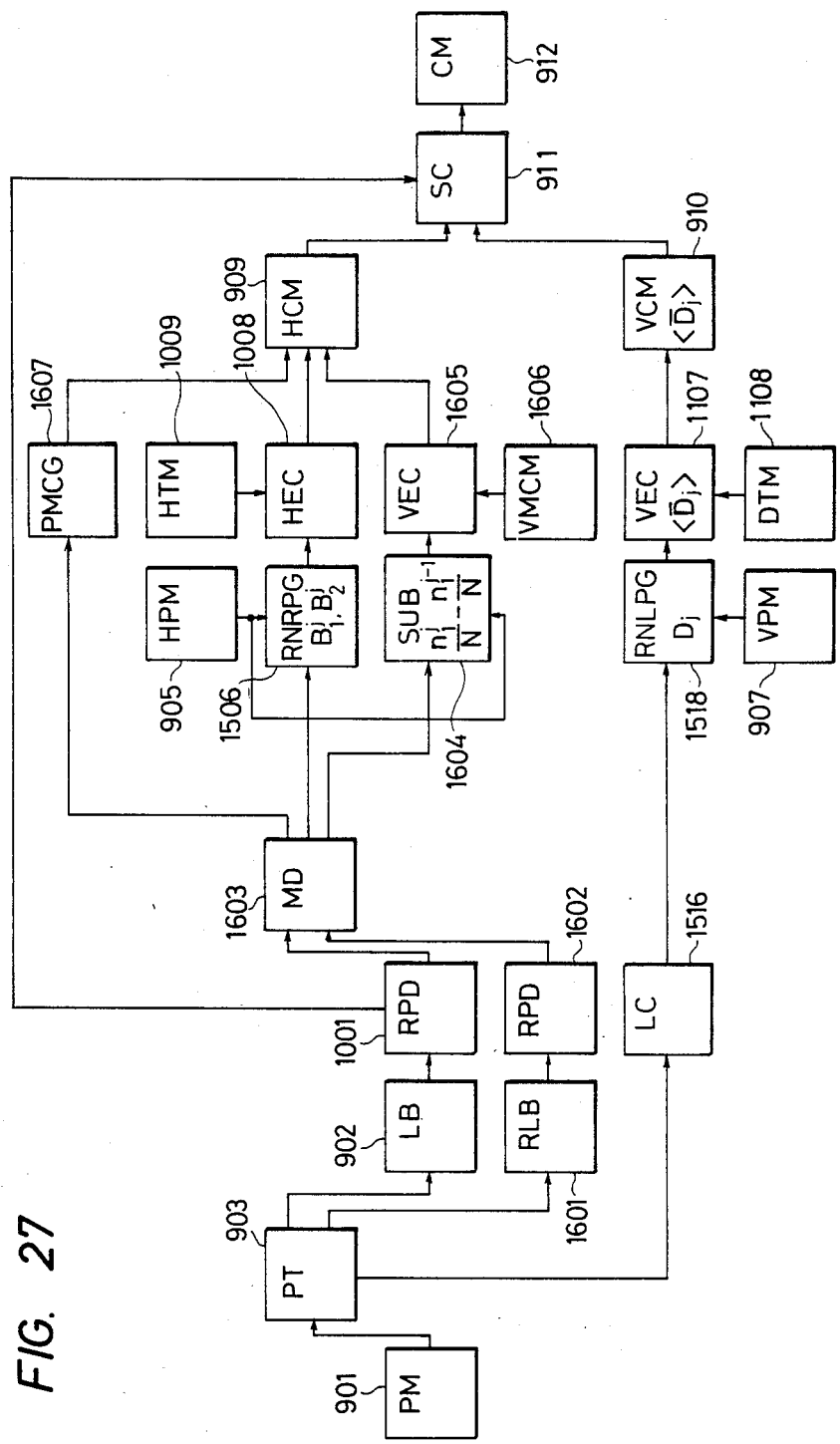
FIG. 27 is block diagram illustrating an example of the arrangement of the present invention as being applied to two-dimensional coding.

Moreover, although in the foregoing the difference between run positions is coded for each line, it is also possible to represent the relative difference between run positions on a certain line and the immediately preceding line by a binary number and to encode it. The arrangement therefor is exemplefied in FIG. 27. The image signal of a coding line is transferred from the pattern memory 901 to the line buffer 902, and the image signal of a line immediately preceding the coding line, that is, the image signal of a reference line, is already transferred to a reference line buffer 1601. The run position in the image signal of the reference line is detected by a run position detector 1602. The detected run position on the reference line and the detected run position on the coding line from the run position detector 1001 are input into a mode detector 1603, wherein it is decided whether the coding mode is a pass, horizontal or vertical mode. The basic concepts of this decision and the subsequent coding are common to the Modified Read coding system (CCITT Recommendation T. 4. Standardization of Group 3 Facsimile Apparatus for Document Transmission. Vol, VII, Facsimile VII. 2, p. 222, 1980) standardized in facsimile. For instance, as shown in FIG. 28, a normalized run position $n_1^j/N$ on the coding line is compared with a normalized run position $n_1^{j-1}/N$ on the reference line which is the nearest thereto. When the absolute value $|n_1^j/N - n_1^{j-1}/N|$ of the difference between them is smaller than a predetermined value, for example, 0.00 . . .011 (f significant digits below the decimal point), the coding mode is decided to be the vertical mode. In a subtraitor 1604 a difference between these normalized run positions, $n_i^j/N$ and $n_i^{j-1}/N$, is calculated, and the calculation result is encoded by a vertical encoder 1605 referring to a vertical mode code table 1606. An example of this code table is shown in the column of the vertical mode in FIG. 29. In the vertical mode, the absolute value $|n_1^{j-1}/N|$ is a binary decimal with f significant digits and smaller than 0.00 . . . 011.

In the case where the coded normalized run position $n_1^j/N$ to be coded on the coding line $m_j$ is larger than the normalized run position $n_2^{j-1}/N$ on the reference line $m_{j-1}$, that is, when the latter normalized run position is further to the left than the coded normalized run position $n_1^j/N$ to be coded in FIG. 28, the coding mode is decided by the mode detector 1603 to be the pass mode, and a pass code generator 1607 outputs a predetermined code, which is 0001 in the example shown in FIG. 29.

When the absolute value $|n_1^j/N - n_1^{j-1}/N|$ is greater than the predetermined value, the coding mode is decided by the code detector 1603 to be the horizontal mode, and relative normalized run positions $b_1^j = n_1^j/N - n_0^j/N$ and $B_2^j = n_2^j/N - n_1^j/N$ are calculated by the relative normalized run position generator 1506 and encoded in the same manner as described above. Let it be assumed, in this case, that codes $<\overline{B_j^j}>$ and $<\overline{B_{j+1}^j}>$ encoded according to the code table shown in FIG. 5 are each added with 011, as depicted in FIG. 29. The output codes of the pass mode code generator 1607, the encoder 1008 and the vertical encoder 1605 are stored in the horizontal code memory 909. The other operations are the same as those described previously.

Figure 30:
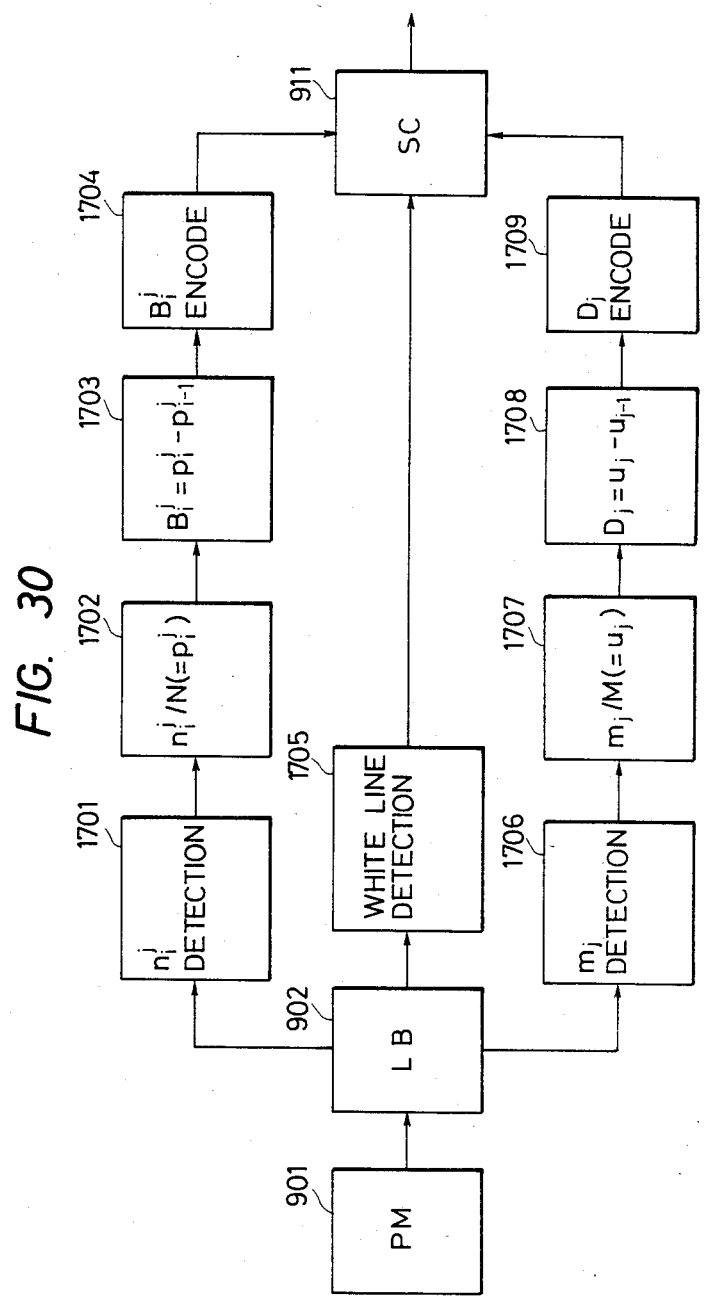
FIG. 30 is a block diagram illustrating the functional arrangement of the present invention for its application to the binary image signal.

In the foregoing the respective parts are each formed by hardware based on the arrangement show in in FIG. 9 and the coded outputs are obtained by pipeline processing. But the respective sequence circuit may also be of asynchronous operation. Also it is possible to constitute the respective parts by microprocessors, or to form them so that a plurality of ones of them are used by a common microprocessor. Accordingly, if shown as a functional block diagram for the binary image signal, the coding system of the present invention is such, for example, as illustrated in FIG. 30. The image signal in the pattern memory 901 is transferred to the line buffer 902 line by line, and the run position $n_i^j$ is detected by a run position detecting section 1701 for the image signal in the line buffer 902. The detected run position $n_i^j$ is normalized by a run position normalizing section 1702 to obtain $p_i^j = n_i^j/N$, and the relative normalized run position $B_i^j = p_i^j - p_{i-1}^j$ relative to an adjacent normalized run position is calculated by a relative run position calculating section 1703. The relative normalized run position $B_i^j$ is encoded by a $B_i^j$ encoding section 1704, providing the code $<\overline{B_i^j}>$. On the other hand, when a white line is detected by a white line detecting section 1705, its code is immediately provided to the synthesizing section 911. Further, the line position $m_j$ of the coding line is detected by a line position detecting section 1706, and the detected line position $m_j$ is normalized by a line position normalizing section 1707. The relative normalized line position $\overline{D_j} = u_j - u_{j-1}$ is calculated by a relative normalized line position calculating section 1708 from a difference between the normalized line position $u_j = m_j/M$ and the encoded normalized line position immediately preceding it, and the relative normalized line position $D_j$ is encoded by a Dj encoding section 1709 into the code $<\overline{D_j}>$. The output codes of the $B_i^j$ encoder 1704, the white line detecting section 1705 and $D_j$ encoding section 1709 are synthesized by the synthesizing circuit 911 for output.

In the foregoing explanation with respect to encoding of multilevel image signal and color image signal the pel values are normalized in terms of the number of levels each pel can take; however, it is also possible to arrange such that the pel value may be normalized in terms of a detected maximum level of pel value in the image to be encoded or a maximum level of pel value which an image detecting device, such as a photodetecting device employed in the image date coding apparatus, can detect.

<Effects>

As has been described in the foregoing, according to the present invention, the line positions of a bilevel or multilevel image signal in the subscaning direction thereof, are each normalized as the binary number $u_j$ and $u_j$, where $0 \leq u_j \leq u_j < 1$, and the relative normalized line position $D_j = u_j - u_j$, which is the difference between the normalized positions, is encoded. The run positions on each line in the main scanning direction of the image signal are each normalized and expressed in the binary number $p_i^j$ where $0 \leq p_i^j < 1$, and the relative normalized run position $B_i^j = p_i^j - p_{i-1}^j$, which is the difference between the normalization run positions, is encoded. In the case of the mulitilevel image signal, the pel value of each run is normalized into the binary number $w_i^j$ where $0 \leq w_i^j < 1$, and the binary number is encoded. In other words, the live and run positions of an image are each mapped into a unit space and normalized, and its relative position is encoded. Accordingly, the present invention produces such effects as follows:

(1) A binary image pattern can be represented which is independent of the physical properties of input/output devices (for example, the scanning density of a scanner or facsimile apparatus, the number of display pels of a CRT), and at the same time, data can be compressed.

(2) Mapping into a unit space can be achieved by simple operations for a shift and subtraction of the binary number, and the coding method used is simple, so that high-speed processing can be achieved by a small amount of hardware, or even by software.

(3) Since the run position and the line position on the decoded unit space can be enlarged or reduced into sizes corresponding to the devices to which they are output, by simple operations for shifts and subtraction of the binary numbers, high-speed processing can be achieved by a small amount of hardware, or even by software.

(4) It is possible to attain matching between a geometric graphic standardization system which uses the input or output plane of an input/output device as the unit space (GKS, CORE, etc. in computer graphics) and the representation format of a binary pattern.

(5) On a new device which is identical in input size with but different in line density from a device before modification, a binary pattern of the sum size encoded on the device before modification can be output.

(6) An input/output program of the binary image pattern need not take into account the physical properties of an input/output device, and this enhances the portability of the input/output program.

(7) Since the binary number which is the result of a division is obtained by counting fractions of 1 as a unit and disregarding 0, accurate decoding can be accomplished.

It will be apparent that many modifications and variations may be effected without departing from the scope of the novel concepts of the present invention.

What is claimed is:

1. An image data compression system for encoding into a compressed code an image signal obtained by main and sub-scannings of an image, comprising:
    line position detecting means for detecting a main-scanned line position from the image signal;
    line position normalizing means for normalizing the line position detected by the line position detecting means;
    relative normalized line position calculating means for obtaining relative normalized line position of the line to be coded relative to an immediately preceding coded line position;
    relative normalized line position encoding means for encoding the relative normalized line positions calculated by the relative normalized line position calculating means;
    run position detecting means for detecting a run position where a pel value changes on one main scan line of the image signal;
    run position normalizing means for normalizing the run position detected by the run position detecting means;
    relative normalized run position calculating means for obtaining relative normalized run positions for adjacent run positions in the image signal;
    relative normalized run position encoding means for encoding the relative normalized run positions calculated by the relative normalized run position calculating means; and
    synthesizing means for combining for each main scan line, the relative normalized line position code encoded by the relative normalized line position encoding means and the relative normalized run position codes encoded by the relative normalized run position encoding means.

2. An image data compression system according to claim 1, wherein each pel value of the image signal is binary.

3. An image data compression system according to claim 1, where each pel value of the image signal is multilevel, and the system includes pel value normalizing means for normalizing the pel value of each pel and normalized pel value encoding means for encoding the normalized pel value and wherein the synthesizing means for combining the normalized pel value codes with the corresponding relative normalized run position codes.

4. An image data compression system according to claim 2 or 3, which includes same-pel line succession detecting means for detecting, from the image signal, a succession of lines of the same pel value, and skipping means for omitting the line position normalization, the relative normalized line position calculation, the relative normalized line position encoding, the relative normalized run position calculation and the relative normalized run position encoding for the detected successive lines of the same pel value.

5. An image data compression system according to claim 4, wherein the omission by the skipping means is for a second to last ones of the successive lines of the same pel value.

6. An image data compression system according to claim 2 or 3, wherein the synthesizing means includes means for adding the combined codes of each line at the forefront thereof with a header representing the length of the combined codes.

7. An image data compression system according to claim 2 or 3, wherein the synthesizing means includes means for adding the combined codes of each line at the end thereof with a terminate code indicating the end of the line.

8. An image data compression system according to claim 2 or 3, wherein the line position normalizing means is a means for dividing the line position $m_j$ by the number of main scanning lines M of the image and representing the division result by a binary number.

9. An image data compression system according to claim 8, which includes means for obtaining the normalized line position represented by the binary number with a predetermined number g of digits by counting fractions of 1 as a unit and disregarding 0 at an $(g+1)$th decimal place.

10. An image data compression system according to claim 8, wherein the relative normalized line position encoding means outputs codes corresponding to the bit values of a predetermined number of digits of the binary number representing the relative normalized line position.

11. An image data compression system according to claim 2 or 3, wherein the run position normalizing means is a means for dividing the run position $n_j$ by the number of pels N of one main scan line and representing the division result by a binary number.

12. An image data compression system according to claim 11, which includes means for obtaining the normalized run position represented by the binary number with a predetermined number f of digits by counting fractions of 1 as a unit and disregarding 0 at an $(f+1)$th decimal place.

13. An image data compression system according to claim 11, wherein the relative normalized run position encoding means outputs a code corresponding to the bit values of a predetermined number of digits of the binary number representing the relative normalized run position.

14. An image data compression system according to claim 3, wherein the pel value normalizing means is a means for dividing the pel value $s_j$ of the image signal by an available number of pel values and representing the division result by a binary number.

15. An image data compression system according to claim 14, wherein the normalized pel value encoding means outputs a code corresponding to the bit values of a predetermined number of digits of the binary number representing the normalized pel value.

16. An image data compression system according to claim 3, wherein the image is a color image, and wherein the pel value normalizing means and the normalized pel value encoding means are respectively a means for normalizing the pel value of each picture element for each color component and a means for encoding the normalized pel value for each color component.

17. An image data compression system according to claim 16, which includes second encoding means for further encoding a combination of the codes of the color components, and wherein the output code of the second encoding means is provided to the synthesizing means in place of the output code of the normalized pel value encoding means.

18. An image data compression system according to claim 2 or 3, which includes means for detecting the normalized run position on a line immediately preceding the normalized run position on the line to be coded and spaced therefrom a distance less than a predetermined value and calculating the distance between these normalized run positions, and means for encoding the calculated distance and encoding the relative normalized run position of the run position.

* * * * *